United States Patent Office 3,462,237
Patented Aug. 19, 1969

3,462,237
COMPOSITION OF MATTER
Lucien Sellet, Saddle River, N.J., assignor to Diamond Alkali Company, a corporation of Delaware
No Drawing. Filed July 28, 1965, Ser. No. 475,600
Int. Cl. C14c 3/18, 3/08
U.S. Cl. 8—94.21                                47 Claims

ABSTRACT OF THE DISCLOSURE

Compositions are prepared using water soluble or water dispersible salts of treating agents, surfactants, epoxides, pigments, solvents and the like. The treating agents are polyurethane resins which are obtained by reacting an isocyanate terminated prepolymer with a hydroxyl containing nitrogen compound which is the Mannich condensation product of phenol, an aldehyde and an alkanolamine. If desired, the treating agent can be alkylolated by reaction of an aldehyde with reactive hydrogen atoms present in the phenol, hydroxyl containing nitrogen compounds and/or the reaction product of the nitrogen compound and prepolymer. Compositions of the treating agents are useful in the treatment of textiles, leather and other substrates.

---

The present invention relates to novel urethane compositions of matter, their preparation from (a) hydroxyl containing nitrogen compounds and (b) isocyanate prepolymers and their utilization, particularly in the treatment of fibrous, porous and nonporous substrates.

It is an object of the present invention to provide for novel treating agents, especially for fibrous, porous and nonporous substrates which are obtained from reaction of hydroxyl containing nitrogen compounds with isocyanate prepolymers obtained from reaction of polyoxyalkylene polyols and polyesters having terminal hydroxyl groups with isocyanates. It is a further object to provide for novel treating agents which when utilized in connection with said fibrous, porous or nonporous substrates bring about enhanced properties of said substrates. Another object is to provide procedures for preparing said novel treating agents. A still further object is to provide for improved leather, paper, glass, plastic, rubber, wood and textile treating agents and compositions containing these agents which impart improved properties when applied to said substrates in such operations as retanning, tanning, dyestuff and pigment binding, dyeing, dispersing, coating and finishing, as well as in applications where treating agent properties such as dispersibility, dyeability, elongation, flexibility, adhesion, antistatic, abrasion resistance, bonding and the like are required. Other objects will become apparent from the detailed description given hereinafter. It is intended, however, that the detailed description and specific examples do not limit the invention but merely indicate preferred embodiments thereof since various changes and modifications within the scope of the invention will become apparent to those skilled in the art.

The above as well as other objects have been most unexpectedly and successfully achieved in the following manner. I have prepared and utilized in the treatment of various porous and nonporous substrates such as films, fibers and other materials, urethane products which can be broadly described as reaction products of (a) hydroxyl containing nitrogen compounds and (b) isocyanate prepolymers. By the term hydroxyl containing nitrogen compounds I mean polyhydroxy compounds containing methylenic alkanolamine radicals such as those obtained when carrying out the Mannich reaction using aryl hydroxy compounds, aldehydes and alkanolamines. By isocyanate prepolymers, I mean those products obtained by reaction of polyols which are polyoxyalkylene polyols and polyesters having terminal hydroxyl groups with organic polyisocyanates. By the term polyoxyalkylene polyol, I mean polyols containing at least two terminal hydroxyl groups.

In more detail, the treating agent comprises the reaction products of (a) a hydroxyl containing nitrogen compound which is the reaction product of a phenol preferably having at least one free phenolic hydroxyl group in the phenolic nucleus and preferably having from one to three reactive hydrogen atoms in the phenolic nucleus, an aldehyde preferably having from one to seven carbon atoms and precursors thereof, and an alkanolamine which is a monoalkanolamine or a dialkanolamine wherein the alkylene group of the alkanolamine has at least two carbon atoms, and (b) a prepolymer which is the reaction product of an organic polyisocyanate with a polyoxyalkylene polyol having a molecular weight of 300 to 5000 and/or a polyester having at least two terminal hydroxyl groups and a molecular weight of 300 to 5000. Other embodiments include reaction of an aldehyde with the hydroxyl containing nitrogen compound prior to its reaction with a prepolymer and/or subsequent reaction of an aldehyde with the treating agent obtained by reaction of the hydroxyl containing nitrogen compound with the prepolymer. In these two latter embodiments, the aldehyde reacts with available reactive hydrogens which are present in the phenol and in the urethane groups.

The above products as will be shown subsequently are useful as dyestuff and pigment binders, leather treating agents, retanning agents, antistatic agents, coating agents, bonding agents, finishing agents for textile fibers and treating agents to improve processing, dyeing and pigmentation of natural fibers, man-made fibers, glass fibers, synthetic fibers such as polyester and the like as well as other substrates. For example, when the products of this invention are used in the retanning of chrome leather stock, they have affinity for the leather and then can be reacted in situ with anionic tanning materials to form reaction products which fill the pores of the leather and upgrade the leather particularly in the flank sections to produce leather which has excellent finishing characteristics. These treating agents can also be used to prepare compositions containing anionic tanning agents which are particularly useful in leather retanning. Compositions of these agents are also useful in impregnating leather. When treating agents are applied as coatings to fibers and cured, they produce very durable films on the fibers. The agents may be colored or pigmented prior to application to substrates or they may be applied as colorless coatings which are subsequenty dyed. Examination of colored or pigmented coatings applied to fibers shows that the coatings have excellent light stability, coating, washfastness, adhesion, abrasion, elongation, flexibility and antistatic properties. Laboratory tests reveal that these films are not adversely affected by exposure to ultraviolet light for periods in excess of 500 hours. Comparable results are obtained with unsupported films as well as with coatings on other porous and nonporous substrates.

These novel urethane compositions of matter have outstanding properties which are in part attributed to the hydroxyl containing nitrogen compounds employed in their preparation. The nitrogen compounds are phenols which contain, in the case of formaldehyde or its precursors, the methylenic alkanolamine radicals shown in Formulas I and II:

(I) 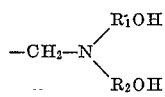

and (II) 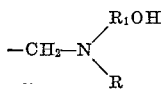

where R is hydrogen or an alkyl radical containing from one to six carbon atoms, $R_1$ is an alkylene group containing from two to four carbon atoms and $R_2$ is an alkylene group containing from two to four carbon atoms. $R_1$ and $R_2$ may be alike or different and are usually vicinal alkylene groups. Such hydroxyl containing nitrogen compounds are obtained by the Mannich reaction of aryl hydroxyl compounds such as phenols with aldehydes and alkanolamines. Hydroxyl containing nitrogen compounds useful in this invention include phenols having at least one methylenic dialkanolamine radical substituent or a methylenic monoalkanolamine radical substituent attached to the phenolic nucleus. These phenols include alkylphenols, polynuclear phenols, polyphenyl phenols, phenols linked by alkylene bridges, fused phenols and the like having at least one free phenolic hydroxyl group and containing at least one methylenic dialkanolamine radical or at least one methylenic monoalkanolamine radical substituent attached to the phenolic nucleus. Methylenic alkanolamine radicals and methylenic dialklanolamine radicals having primary hydroxy groups are preferred because they provide primary hydroxy groups of relatively high reactivity for reaction with isocyanate groups in preparing the final products. When desired, one of the hydrogen atoms attached to the methylenic carbon atoms can be substituted with an alkyl or aryl radicals containing from one to six carbon atoms. It is to be understood that mixtures of hydroxyl containing nitrogen compounds may be used in the preparation of these treating agents. The treating agents disclosed in this invention are prepared by reaction of polyisocyanate prepolymers with these hydroxyl containing nitrogen compounds. The polyisocyanate prepolymers employed in the preparation of these treating agents are obtained by reacting polyisocyanates with polyoxyalkylene polyols and polyesters having terminal hydroxyl groups and are described in detail below in the section entitled "Preparation of Prepolymers."

These treating agents are unique in that they are not sensitive to water and may be applied from aqueous solutions or dispersions. Certain embodiments of these treating agents also have the advantage that they crosslink or cure when exposed to heat and/or catalyst under appropriate conditions. These treating agents may be used directly or in the form of their salts. They may be used with acids, surfactants, solvents and the like to obtain compositions for use in applications where specific requirements such as dispersibility, water-solubility, solvent solubility or the like are encountered.

Since treating agents obtained from these hydroxyl containing nitrogen compounds enhance properties such as film forming, coating, dyeability, dispersibility, adhesion, abrasion, washfastness, antistatic, light stability and other properties as well as acting as carriers and binders for pigments and dyestuffs, it is a definite advantage to be able to vary the nature and the properties of the hydroxyl containing nitrogen compounds employed in the urethane treating agents disclosed in this invention as described herein.

Treating agents which have reactive hydrogen atoms attached to the phenolic nucleus of these hydroxyl containing nitrogen compounds can be prepared. Such treating agents have hydrogen atoms that are reactive with aldehydes so that alkylol derivatives can be prepared. For example, methylol derivatives can be prepared by reaction of formaldehyde with a treating agent derived from a hydroxyl containing nitrogen compound which has reactive hydrogen atoms attached to the phenolic nucleus. Additionally, available reactive hydrogens on the nitrogen atoms in the urethane moiety can also be alkylolated by use of aldehyde. It is understood that if there are any unreacted hydrogens in the phenol moieties of the treating agent, the aldehyde will react with these as well as with the available hydrogens on the urethanes. Such alkylol or methylol derivatives are particularly valuable as treating agents because they also cure or crosslink when exposed to heat and/or catalyst under appropriate conditions.

Treating agents of the various types described above may be used in compositions with epoxides having at least eight carbon atoms such as the epoxides of soya bean oil, linseed oil, triglycerides of epoxidized fatty acids such as oleic, linolenic, myristoleic, palmitoleic, eleostearic and arachidonic acids, 1,2-epoxy dodecane, 4,5-epoxy eicosanes such as di (isodecyl) 4,5-epoxide and the like. These epoxide compositions of treating agents are particularly useful in enhancing desirable properties such as hand, washfastness and the like when these formulations are applied to natural fibers, glass fibers, synthetic fibers and the like and cured. Similar compositions can be prepared with epoxides such as the diepoxide of the diglycidyl derivative of 4,4'-dihydroxy-diphenyl-dimethyl methane. Such compositions are useful as adhesives and sealants for bonding wood-to-wood, wood-to-metal, metal-to-metal and other substrates.

PREPARATION OF HYDROXYL CONTAINING NITROGEN COMPOUNDS

Hydroxyl containing nitrogen compounds useful in the present invention have at least one methylenic alkanolamine radical attached to the phenolic nucleus of the molecule. Such compounds can be prepared by the Mannich reaction when from about one to three mols of aldehyde and alkanolamine, present in approximately equimolar amounts with respect to each other, are condensed with about one mole of an aryl hydroxyl compound such as phenol and the like. Preparation of these compounds can be achieved by methods described in U.S. Patent No. 2,033,092, Bruson, Mar. 3, 1936; U.S. Patent No. 2,114,122, Bruson, Apr. 12, 1938 and U.S. Patent No. 2,220,834, Bruson et al., Nov. 5, 1940. Formulas III to VII inclusive illustrate the types of reaction products obtained when from one to three moles of formaldehyde and from one to three moles of diethanolamine, present in approximately equimolar amounts with respect to each other, are condensed with one mole of phenol. For example, condensation of one mole of formaldehyde and one mole of diethanolamine with one mole of phenol yields nitrogen compounds of the type shown in Formulas III and IV.

(III) 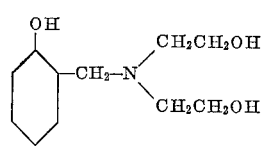

and (IV) 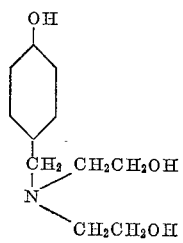

Likewise, when two moles of formaldehyde and two moles of diethanolamine are condensed with one mole of phenol, compounds of the types shown in Formulas V and VI are obtained.

(V)
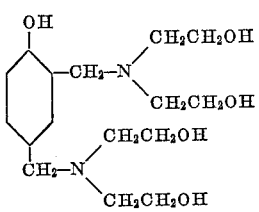

and (VI)
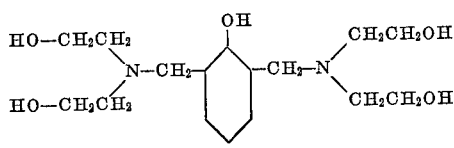

When three moles of formaldehyde and three moles of diethanolamine are condensed with one mole of phenol, the compound shown in Formula VII is obtained.

(VII)
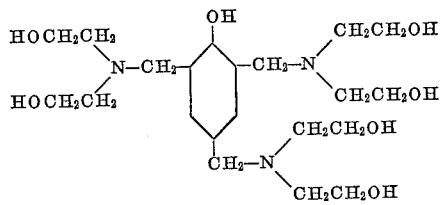

Formulas III to VII inclusive illustrate various types of hydroxyl containing nitrogen compounds obtained in the Mannich reaction of formaldehyde and diethanolamine with phenol. It is of course understood that, in practice, the hydroxyl containing nitrogen compounds are not necessarily obtained in pure form, but quite often are obtained as mixtures of compounds with one particular type predominating. Further, it should be understood that the above and subsequent structural formulas are set forth herein to facilitate and understanding of the present invention. They are not however to be construed as limiting the present invention to their precise structures.

Similar compounds are obtained when monoethanolamine, N-methyl monoethanolamine or N-ethyl monoethanolamine is substituted for diethanolamine in the Mannich reaction. Likewise alkanolamines such as dipropanolamines, monopropanolamines, N-alkyl monopropanolamines, dibutanolamines, monobutanolamines, N-alkyl monobutanolamines, their isomers and higher homologues or the like can be substituted for diethanolamine.

Aldehydes or precursors thereof containing from one to seven carbon atoms can be used in the Mannich reaction. For example, formaldehyde can be used in the form of 30 to 40% aqueous solutions, 30 to 55% alcohol solutions with alcohols such as methanol, n-butanol, i-butanol or the like. Formaldehyde can also be used in any of its polymeric forms such as paraformaldehyde, trioxane, hexamethylene tetramine or the like. Other aldehydes such as acetaldehyde, butyraldehyde, furfuraldehyde, chloral, alpha-ethyl-beta-propylacrolein, benzaldehyde or the like can be substituted for formaldehyde in the Mannich reaction.

Phenols such as alkylphenols, polynuclear phenols, polyphenyl phenols, phenols linked by alkylene bridges (novolaks), fused phenols and the like having at least one free phenolic hydroxyl group and at least one reactive hydrogen in the phenolic nucleus can be substituted for phenol in the Mannich reaction.

Compounds similar to those shown in Formulas III to VII inclusive can be prepared from 3-alkylphenols such as 3-methylphenol (m-cresol), 3-n-pentadecyl phenol, their isomers, homologues, mixtures, and the like by condensing one mole of 3-alkylphenol with from one to three moles of analdehyde and from one to three moles of alkanolamine, the aldehyde and alkanolamine being present in approximately equimolar amounts with respect to each other.

Other useful hydroxyl containing nitrogen compounds can be prepared from 2-alkylphenols, 4-alkylphenols, 2,4-dialkylphenols and 2,6-dialkylphenols by use of the Mannich reaction. For example, 2-alkylphenols and 4-alkylphenols can be reacted with from one to two moles of aldehyde and from one to two moles of diethanolamine, the aldehyde and alkanolamine being present in approximately equimolar amounts with respect to each other, to obtain nitrogen compounds having from one to two methylenic diethanolamine radicals. 2-alkylphenols which can be used in the preparation of hydroxyl containing nitrogen compounds include 2-methylphenol, 2-ethylphenol, 2-n-propylphenol, 2-i-propylphenol, 2-n-butylphenol, 2-t-butylphenol, 2-n-pentylphenol, 2-n-hexylphenol, 2-heptylphenol, 2-n-octylphenol, 2-t-octylphenol, 2-n-nonylphenol, 2-i-nonylphenol, 2-n-decylphenol, 2-n-dodecylphenol, 2-n-tridecylphenol, 2-n-tetradecylphenol, 2-n-pentadecylphenol, 2-n-hexadecylphenol, 2-n-octadecylphenol, 2-n-nonadecylphenol, 2-n-eicosylphenol, 2-n-docosylphenol, 2-n-triacontylphenol, their isomers, their mixtures and the like. The corresponding 4-n-alkylphenols, their isomers, their mixtures and the like can also be employed. Such monoalkylphenols are well known in the art, particularly those containing branched substituents and are used extensively in the manufacture of surfactants, anti oxidants and the like. Many of these alkylphenols can be prepared by alkylation of phenol with olefins containing from three to thirty carbon atoms. Usually alkylation procedures give mixtures of 2- and 4-alkylphenols. Alkylphenols can be used in the form of these mixtures or the 2-alkylphenols can be separated from the 4-alkylphenols by distillation or other methods and used individually.

The corresponding 2,4-dialkylphenols and 2,6-dialkylphenols can be prepared by alkylation methods similar to those described above, that is, by reaction of one mole of phenol with two moles of olefins containing from three to thirty carbon atoms. It is to be understood that dialkylphenols which contain dissimilar alkyl groups can be employed. For example, dialkylphenols such as 2-methyl-4-nonylphenol and 2-octyl-4-methylphenol can be used. Such phenols can be obtained by alkylation of the corresponding methylphenols. Dialkylphenols obtained by these alkylation methods can also be used as mixtures or the desired 2,4-dialkylphenols may be separated from the 2,6-dialkylphenols and used individually.

It is to be understood that olefins employed in the preparation of the above alkylphenols can be either linear or branched chain olefins and that mixtures of such olefins can be used. Generally, α-olefins are preferred because of their high reactivity. Linear olefins obtained by the reaction of ethylene with metal alkyls such as the Ziegler type compounds or those obtained in the wax cracking of fats are particularly useful in the preparation of alkylphenols.

Other phenols useful in the Mannich reaction include o-phenylphenol and p-phenylphenol as well as phenols linked to aromatic groups by alkylene bridges such as those in α-methylbenzyl-o-phenol and α-dimethylbenzyl-o-phenol. These phenols can be alkylated to produce other types of phenols which are useful in the Mannich reaction. Formula IX illustrates a Mannich reaction product obtained by the reaction of one mole of α-methylbenzyl-o-phenol, one mole of formaldehyde and one mole of diethanolamine which is useful as a hydroxyl containing nitrogen compound in the present invention.

(IX)

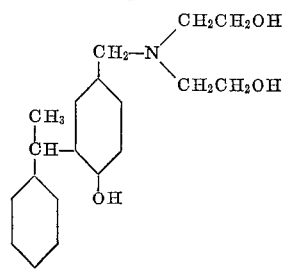

Additional examples of useful phenols are polynuclear phenols, polyphenyl phenols, phenols linked by alkylene bridges (novolaks), fused phenols and the like such as diphenol, 4,4'-dihydroxy-diphenyl-dimethyl methane, 4,4'-dihydroxy - diphenyl - methyl-methane, 4,4'-dihydroxy-diphenylmethane, 1-naphthol, 2-naphthol, and the like having at least one reactive hydrogen therein.

Formula X illustrates a hydroxyl containing nitrogen compound obtained by bridging two phenols containing methylenic diethanolamine radicals by reaction with formaldehyde. This hydroxyl containing nitrogen compound in which two phenolic nuclei or two phenolic moieties are linked by an alkylene bridge is particularly useful in the present invention.

(X)

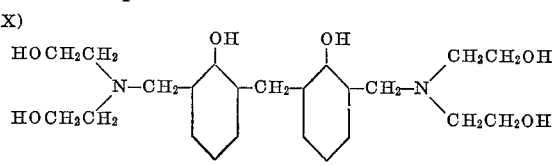

Phenols having two free phenolic hydroxyl groups and having at least one reactive hydrogen in the phenolic nucleus such as catechol, resorcinol, hydroquinone and the like can also be employed in the Mannich reaction to produce hydroxyl containing nitrogen compounds useful in the present invention.

Thus as shown by the aforedescribed examples of phenols which are useful herein, it is clear that wherever the term phenol is used, it is intended to encompass the phenols of the kind described above in addition to phenol itself and including phenols having one, two or more phenolic nuclei or moieties.

These hydroxyl containing nitrogen compounds can be prepared in the following manner by reaction by alkanolamine, aldehyde and phenol at 5° to 110° C. Usually from one to three moles of the desired alkanolamine and a solvent such as water or a monohydric alcohol are charged to a reactor equipped with agitator, reflux condenser and provision for external heating and cooling. The amine solution is cooled to from 5° to 15° C. and a solution of from one to three moles of an aldehyde in a solvent such as water or a monohydric alcohol is added to the cooled alkanolamine solution over a period of from one-half to two hours. The temperature is maintained below 15° C. during this addition. A solution containing one mole of the desired phenol in a solvent such as water or a monohydric alcohol is then added to the reaction mixture over a period of from one-half to two hours while the temperature is maintained in the range of from 15° C. to 40° C. The resulting reaction mixture is then stirred for an additional fifteen minutes to two hours at a temperature of from 15° to 40° C., then heated to from 60° to 90° C. and held at this temperature for from one to four hours to complete reaction. The resulting product which is the hydroxyl containing nitrogen compound is then heated under vacuum to remove water, monohydric alcohols and other volatiles by distillation. Vacuum distillation is continued at 90° to 110° C. until the water content of the resulting hydroxyl containing nitrogen compound is about 0.5% by weight.

If desired, an aldehyde or precursor thereof of the type previously described, can be introduced at this point in amounts sufficient to react with some or all of the available reactive hydrogens in the phenolic moiety or phenolic moieties in the phenol of the hydroxyl containing nitrogen compound. These available hydrogens are in the ortho and para positions. It is of course understood that where said phenol is the hydroxyl containing nitrogen compound and has a plurality of phenolic moieties, there will be a maximum of two available reactive hydrogens in the first phenolic moiety and only one in each of the remaining phenolic moieties. Formula XI illustrates a hydroxyl containing nitrogen compound in which the phenol has three phenolic moieties and four available hydrogens in the ortho and para positions.

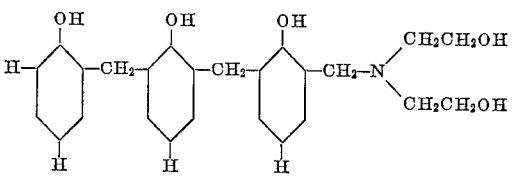

(XI)

Likewise, Formula XII illustrates a hydroxyl containing nitrogen compound in which the phenol has four phenolic moieties and five available reactive hydrogens in the ortho and para positions.

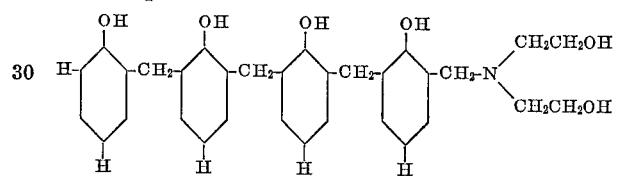

(XII)

It is of course understood that replacement of available hydrogens with methylenic alkanolamine radicals in the phenolic moiety will reduce available unreacted hydrogen for subsequent reaction with aldehydes or their precursors. After addition of the aldehyde or precursor thereof to the hydroxyl containing nitrogen compound, reaction at 5° to 110° C. for, e.g., one hour to twenty hours is carried out. The resulting reaction product is vacuum distilled at 70° to 110° C. until the water content is less than 0.5% by weight.

PREPARATION OF PREPOLYMERS

Polyisocyanates are used in the form of prepolymers which are prepared by reacting one or more polyisocyanates with a polyoxyalkylene polyol or polyester having at least two terminal hydroxyl groups. These prepolymers are prepared under anhydrous conditions by mixing one or more of the hydroxy terminated compounds with an excess of an organic polyisocyanate and heating the mixture to a temperature of from about 50° to 100° C. to form a prepolymer having a reactive isocyanate group. An alternate procedure is to react a polyisocyanate with a molar excess of a polyoxyalkylene polyol or a polyester having at least two terminal hydroxyl groups, then cap the resulting product, that is, react it with additional organic polyisocyanate having reactive isocyanate groups. By the term polyoxyalkylene polyol, I mean any hydroxyl containing compound which has diol, triol or higher hydroxyl functionality. The polyesters, however, should have at least two terminal hydroxyl groups. By an excess polyisocyanate, is meant at least 1.1 isocyanate groups for each hydroxyl group. The preferred ratio of equivalents of isocyanate groups to hydroxyl groups in the prepolymer should be 2:1. The quantity of isocyanate in the prepolymer can also be expressed on a weight basis. Thus, for example, a prepolymer prepared from tolylene diisocyanate and a polyoxyethylene glycol having an average molecular weight of 300 has an isocyanate content of 14.3% by weight. It is clear that as the weight of the polyoxyethylene glycol increases, the weight percent of isocyanate in the prepolymer will decrease. Thus, a prepolymer from tolylene diisocyanate and a polyoxyethylene glycol having an average molecular weight of 3350 has an isocyanate content of 2.3% by weight.

Representative polyisocyanates include tolylene-2,4-diisocyanate,
tolylene-2,6-diisocyanate,
tolylene diisocyanate (65% 2,4; 35% 2,6),
tolylene diisocyanate (80% 2,4; 20% 2,6),
1,6-hexamethylenediisocyanate (HDI),
1,4-tetramethylenediisocyanate,
hexamethylene diisocyanate,
1,10-decamethylenediisocyanate,
1,5-naphthalenediisocyanate ((NDI),
cumene-2,4-diisocyanate,
4-methoxy-1,3-phenylenediisocyanate,
4-chloro-1,3-phenylenediisocyante,
4-bromo-1,3-phenylenediisocyanate,
4-ethoxy-1,3-phenylenediisocyanate,
2,4'-diisocyanatodiphenylether,
diphenyl methane-4,4'-diisocyanate (MDI),
5,6-dimethyl-1,3-phenylenediisocyanate,
2,4-dimethyl-1,3-phenylenediisocyanate,
4-isopropyl-1,3-phenylene diisocyanate,
4,4'-diisocyanatodiphenylether,
benzidinediisocyanate,
o-nitrobenzidene diisocyanate,
4,6-dimethyl-1,3-phenylenediisocyanate,
9,10-anthracene-diisocyanate,
4,4'-diisocyanatodibenzyl,
3,3-dimethyl-4,4'-diisocyanato-diphenylmethane,
2,6-dimethyl-4,4'-diisocyanatodiphenyl,
2,4-diisocyanatostilbene,
4,4'-diphenyl diisocyanate (XDI),
3,3'-dimethyl-4,4'diphenyl diisocyanate (TODI),
3,3'-dimethoxy-4,4'-diphenyl diisocyanate (DADI),
1,4-anthracenediisocyanate,
mesitylene diisocyanate,
durylene diisocyanate,
2,5-fluorenediisocyanate,
1,8-naphthalenediisocyanate,
2,6-diisocyanatobenzofuran,
2,4,6-toluenetriisocyanate,
tritholylmethane triisocyanate,
2,4,4'-triisocyanatophenyl ether, the reaction product of toluene diisocyanate with trimethylol propane at an NCO/OH ratio of 2:1 (Mondur CB) and the reaction product of toluene diisocyanate with 1,2,6-hexanetriol at an NCO/OH ratio of 2:1. Another useful isocyanate (PAPI-1) has the general formula

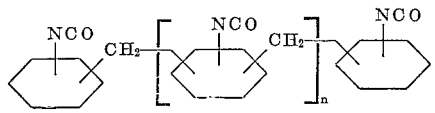

where $n$ has an average value of about 1. Mixtures of polyisocyanats may also be used.

Typical examples of prepolymers having reactive isocyanate groups are those formed with tolyene diisocyanates and polyoxyalkylene polyols. Polyoxyalkylene polyols used in the prepolymers usually have a molecular weight of about 300 to 5000 and preferably 600 to 4000 and include, for example, polyoxyethylene glycol having a molecular weight of 1540, polyoxypropylene glycol having a molecular weight of 1025, polyoxytetramethylene glycol, polyoxyhexamethylene glycol, polyoxyoctamethylene glycol, polyoxynonamethylene glycol, polyoxydecamethylene glycol, polyoxydodecamethylene glycol and mixtures thereof. Polyoxyalkylene glycols containing several different radicals in the molecular chain such as, for example, the compound $$HO(CH_2OC_2H_4O)_nH$$

Wherein $n$ is an integer greater than 4 can also be used. For example polyacetals having hydroxyl groups and molecular weights of more than 300 can be prepared when an aldehyde and an alcohol such as formaldehyde and ethylene glycol are used.

Other polyoxyalkylene polyols which can be employed in the preparation of the polyether prepolymers include those prepared by reaction of 1,2-alkylene oxides such as ethylene oxide, propylene oxide, their mixtures and the like with polyhydroxy compounds such as glycerol, hydroxy containing glycerides, trimethylolethane, trimethylolpropane, 1,2,6-hexanetriol, pentaerythritol, dipentaerythritol, tripentaerythritol, sorbitol, mannitol and the like, glucosides such as methyl, ethyl, propyl, butyl and 2-ethylhexyl arabinoside, xyloside, fructoside, glucoside, rhammoside and sucrose. For example an ethylene oxide adduct of glycerol having an average molecular weight of 2000 can be used. A propylene oxide adduct of trimethylol-propane terminated with ethylene oxide to obtain a product with primary hydroxyl groups having an average molecular weight of 4500 can also be used. Likewise, an ethylene oxide adduct of pentaerythritol having an average molecular weight of 3000 can be used. A propylene oxide adduct of 1,2,6-hexanetriol having an average molecular weight of 1000 can be employed.

Polyoxyalkylene polyols prepared by reacting alkylene oxides with mononuclear polyhydroxybenzenes such as resorcinol, pyrogallol, phloroglucinol, hydroquinone, 4,6-di-t-butylcatechol, catechol, orcinol, and other alkylated polyhydroxy benzenes are also useful. Likewise polyoxyalkylene polyols prepared by reacting alkylene oxides with fused ring systems such as 3-hydroxy-2-naphthol, 6,7-dihydroxy-1-naphthol, 2,5-dihydroxy-1-naphthol, 9,10-dihydroxyanthracene, 2,3-dihydroxy-phenanthrene and the like can be used.

Other polyoxyalkylene polyols which can be employed include those obtained by reacting 1,2-alkylene oxides or mixtures thereof with polynuclear phenols such as the various di-, tri- and tetraphenol compounds in which phenols are attached by means of single bonds or by an aliphatic hydrocarbon radical.

Another particularly useful group of polyoxyalkylene polyols which can be employed are the alkylene oxide adducts of the Novolaks. These products are believed to be mixtures of polynuclear compounds of the diphenylmethane type of structure such as 4,4'-dihydroxy-diphenylmethane and 2,4'-dihydroxydiphenylmethane formed by the Baeyer reaction of phenol and formaldehyde. In a typical synthesis, Novolaks are prepared by condensing one mole of a phenol, such as phenol, cresol or other alkylphenol with 0.8 mole of an aldehyde such as formaldehyde or furfuraldehyde under acidic conditions at temperatures of from 160° C. to 170° C. These polynuclear phenols frequently contain 4 to 8 units and may contain 12 or more units. They are non-curable thermoplastic resins.

Further included are the polyoxyalkylene polyols having nitrogen bridges prepared by reacting one or more of the alkylene oxides above noted with ammonia or acyclic polyamines such as ehylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylenepentamine, and the like. A particularly suitable polyoxyalkylene polyol is the propylene oxide addition product of diethylenetriamine represented by the formula:

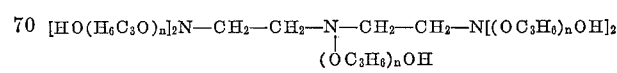

wherein $n$ represents an integer which provides an average molecular weight of 300 or higher.

Other suitable polyoxyalkylene polyols include the 1,2- alkylene oxide derivatives of mononuclear primary amines such as o-, m-, and p-phenylenediamine; 2,4- and 2,6-diaminotoluene; 2,6 - diamine - p-xylene; 4,6-diamino-m-xylene; 2,4-diamino-m-xylene; 3,5-diamino-o-xylene; isohexyl-p-phenylenediamine; 3,5-diaminotoluene; and the like; polynuclear and fused aromatic polyamines such as 1,4 - naphthylenediamine; 1,5-naphthylenediamine; 1,8-naphthylenediamine; benzidine; toluidine; 4,4'-methylenedianiline; 3,3'-dimethoxy-4,4'-biphenyldiamine; 3,3'-dichloro-4,4'-biphenylidiamine; 3,3'-dimethyl-4,4'-biphenyldiamine; 4,4'-ethylenedianiline; 4,4'-ethylidenedianiline; 1 - fluorenamine; 2,5 - fluorenediamine; 2,7 - fluorenediamine; 1,4-anthradiamine; 3,3'-biphenyldiamine; 3,4-biphenyldiamine; 9,10-diaminophenanthrene; 4,4'-diaminoazobenzene, and the like.

Higher functional mono- and polynuclear polyamines can also be reacted with 1,2-alkylene oxides to provide useful polyoxyalklyene polyols. These amines include 2,4, 6-triaminotoluene; 2,3,5-triaminotoluene; 5,6 - diaminoacenaphthalene; 4,4',4" - methylidynetrianiline, 3,5 - diaminobenzoic acid, triaminodiphenyl ethers and sulfides such as 2,4,4'-triaminodiphenyl ether; 2,3',4-triamino-4'-methoxydiphenyl ether; and polyamines obtained by interaction of aromatic monoamines with formaldehyde or other aldehydes, for example:

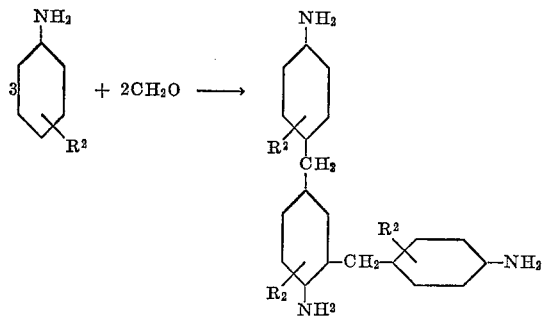

wherein $R^2$ is hydrogen or an alkyl group.

Polyoxyalkylene polyols having sulfur bridges include the condensation products of thioglycol with itself or with other polyhydric alcohols such as ethylene glycol, diethylene glycol, trimethylolpropane and the like. Such polyols can also be condensed with the above mentioned aromatic amines and phenols. Other suitable polycondensation products having sulfur and nitrogen bridges include those obtained with thioglycol with aromatic amines such as xylidene, toluidines or reaction products of these aromatic amines with alkylene oxides such as ethylene oxide, propylene oxide and the like.

Polyesters which can be used instead of or in conjunction with polyoxyalkylene polyols in preparing prepolymers include, for example, those formed by reacting organic aliphatic, cycloaliphatic or aromatic di- or polycarboxylic acids, or their ester forming derivatives thereof such as anhydrides, acid halides and the like with polyols. These hydroxyl terminated polyesters must have at least two terminal hydroxyl groups. They may also be prepared by known transesterification methods. These polyesters have molecular weights on the order of those of the aforementioned polyoxyalkylene glycols, and preferably about 600 to 4000. Acids useful for preparing such polyesters include maleic, azelaic, itaconic, citraconic, succinic, adipic, suberic, sebacic, o-phthalic, isophthalic, terephthalic and hexahydroterephthalic acids, their anhydrides and the alkyl unsaturated and halogen substituted derivatives of these acids as well as their homologues. Other typical acids include hydroxy acids containing from 15 to 20 carbon atoms such as hydroxy palmitic acids, hydroxy stearic acids, ricinoleic acid and the like. Other dibasic acids include dimer acids such as the dimerized unsaturated acids chosen from the octadecadienoic acids preferably from the 9,12-octadecadienoic acid (linoleic acid) to form dilinoleic acids. The dilinoleic acids are prepared by the Diels-Alder reaction. Various fats and oils such as castor oil, soybean oil and the like can also be used. Useful polyols for preparing the polyesters are low molecular weight polyols such as ethylene glycol, diethylene glycol, triethylene glycol, 1,4-butylene glycol, 1,6-hexanediol and their mixtures; glycerol, trimethylolethane, trimethylolpropane, 1,2,6 - hexanetriol, pentaerythritol, dipentaerythritol, tripentaerythritol, sorbitol, sucrose and the like as well as reaction products of the above mentioned polyols with alkylene oxides such as ethylene oxide, propylene oxide, their mixtures and the like.

It is to be understood that the polyether and polyester prepolymers described above must contain at least one unreacted, i.e., free, or reactive, isocyanate group for subsequent reaction with the hydroxyl containing nitrogen compound.

INTERREACTION OF HYDROXYL CONTAINING NITROGEN COMPOUNDS WITH PREPOLMERS

The hydroxyl containing nitrogen compounds and the prepolymers described above are interreacted to obtain new and novel urethane compositions of matter which are useful as treating agents and bonding agents in this invention. The hydroxyl containing nitrogen compounds and prepolymers are interreacted in such proportions that all of the reactive, i.e., unreacted or free isocyante groups are reacted. If desired, the hydroxyl containing nitrogen compound may be substituted in part by an alcohol such as ethanol, isopropanol or the like. When the treating agents are used in the form of solutions or dispersions, particularly in aqueous systems, for the treatment of textiles, leather and the like, gelling of the final reaction product of the hydroxyl containing introgen compound and the prepolymer must be avoided so that treating agent compositions having useful viscosities, solubility characteristics and dispersibility characteristics, are obtained. Gelation of the final product is controlled by selection of the ratio in which the alkanol radicals containing from two to four carbon atoms attached to the nitrogen atom in the hydroxyl containing nitrogen compounds as well as from any alcohols present are reacted with the reactive isocyanate groups in the prepolymer. Generally, to avoid gelation, the ratio of the alkanol radicals and isocyanate groups is not less than 2:1. Of course, an excess of alkanol radicals can be present, however, this is not essential for this invention. For example, in the case of a difunctional prepolymer, that is, a prepolymer containing two reactive isocyanate groups available for reaction with the alkanol radicals in the hydroxyl containing nitrogen compound, a hydroxyl containing nitrogen compound having two alkanol radicals attached to one nitrogen atom as shown in Formula III above is reacted with the prepolymer in a ratio of not less than four alkanol radicals per two reactive isocyanate groups, that is, not less than two moles of the hydroxyl containing nitrogen compound is reacted with one mole of the difunctional prepolymer. Likewise not less than three moles of the hydroxyl containing nitrogen compound shown in Formula III above is interreacted with one mole of a trifunctional prepolymer, that is, a prepolymer containing three reactive isocyanate groups to avoid gelation. Additionally, to avoid gelation, at least four moles of the hydroxyl containing nitrogen compound shown in Formula III above must be interreacted with one mole of a tetrafunctional prepolymer, that is, a prepolymer containing four reactive isocyanate groups.

Where the hydroxyl containing nitrogen compound contains four alkanol radicals as shown in Formula V above, at least one mole of said hydroxyl containing nitrogen compound is reacted with a difunctional prepolymer, that is, a prepolymer containing two reactive isocyanate groups. When the hydroxyl containing nitrogen compound contains six alkanol radicals as in the case of the compound shown in Formula VII above, at least one mole of this hydroxyl containing nitrogen compound is interreacted with one mole of a trifunctional prepolymer, that is, a prepolymer containing three reactive isocyanate groups.

In cases where the hydroxyl containing nitrogen compound has only one alkanol radical attached to a single nitrogen atom in the molecule as in the case of a compound derived from a monoalkanolamine such as monoethanolamine or N-methyl monoethanolamine, gelation is usually avoided by interreaction of as little as one mole of the hydroxyl containing nitrogen compound with each reactive isocyanate group in the prepolymer. For example, two moles of the hydroxyl containing nitrogen compound, each mole of which contains one alkanol radical can be interreacted with one mole of a difunctional prepolymer containing two reactive isocyanate groups. Likewise three moles of the same hydroxyl containing nitrogen compound can be interreacted with one mole of a trifunctional prepolymer and four moles of the same hydroxyl containing nitrogen compound can be interreacted with one mole of a tetrafunctional prepolymer. It is to be understood that mixtures of hydroxyl containing nitrogen compounds having varying numbers of alkanol radicals can be reacted with mixtures of isocyanate prepolymers having various numbers of reactive isocyanate groups. However, for those applications where it is desirable to avoid gelation, the abovementioned limitation is to be observed.

In those cases where bonding agents are desired, the final reaction product of the hydroxyl containing nitrogen compound and the prepolymer should be a high viscosity product or a gel. Therefore, the ratio of alkanol radicals in the hydroxyl containing nitrogen compound which are interreacted with the isocyanate groups in the prepolymer should be such as to give a gel. For example, the ratio of alkanol radicals in the hydroxyl containing nitrogen compound and the isocyanate groups in the prepolymer should be 1:1. That is, each alkanol radical in the hydroxyl containing nitrogen compound should be reacted with a reactive isocyanate group in the prepolymer. For example, one mole of a hydroxyl containing nitrogen compound of the type shown in Formula III above should be interreacted with one mole of a difunctional prepolymer having two reactive isocyanate groups. Likewise, one mole of a hydroxyl containing nitrogen compound of the type shown in Formula V above which has four alkanol radicals should be reacted with two moles of a difunctional prepolymer having two reactive isocyanate groups.

Treating agents can be prepared by interreaction of hydroxyl containing nitrogen compounds and prepolymers for thirty minutes to six hours at temperatures of from about 25° to 160° C. Hydroxyl containing nitrogen compounds can be interreacted with prepolymers by the following procedure. The required amount of prepolymer is charged into a reactor equipped with agitator and heated with agitation to a temperature of from about 40° to about 80° C. The required amount of hydroxyl containing compound is heated in a second reactor to a temperature of from about 40° to about 80° C. The heated prepolymer is then slowly added over a period of time from about fifteen minutes to about two hours to the heated hydroxyl containing nitrogen compound in the second reactor while the reaction temperature is maintained at from about 40° to about 80° C. After addition of the prepolymer is complete, the reaction mixture is heated to a temperature of from about 80° to about 160° C. and maintained within this temperature range for a period of time from thirty minutes to four hours to complete reaction. The resulting product which is a treating agent is cooled to room temperature. Optionally, the hydroxyl contains nitrogen compound and prepolymer can be mixed at 25° C. and interreacted at temperatures up to 160° C.

The treating agent may be used directly or may be used to prepare treating agent compositions. The agent may be reacted with acids to form salts which are soluble or dispersible in water and/or other solvents. Acids such as formic acid, acetic acid, propionic acid, butyric acid, isobutyric acid, succinic acid, maleic acid and the like may be used in the preparation of salts of the treating agent. Organic acids which form treating agent salts that disassociate on heating are particularly useful in the preparation of treating agent compositions. When desired, compositions of treating agents or their salts may be prepared with surfactants, alcohols, chlorinated solvents and the like. Surfactants such as nonionic surfactants and cationic surfactants can be used in these compositions. Such surfactants include nonionic surfactants obtained from the reaction of alkylene oxides such as ethylene oxide with alkylphenols, fatty acids and the like and cationic surfactants such as those obtained from the reaction of alkylene oxides with nitrogen containing hydrophobic compounds and those obtained by quaternization of nitrogen containing compounds. Solvents which can be employed in treating agent compositions include water, hydrophilic alcohols such as methanol, ethanol, 2-methoxyethanol, isopropanol and the like, hydrophobic alcohols, chlorinated solvents such as chlorinated ethylenes, chlorinated benzenes and the like and aromatic solvents such as benzene, toluene, xylenes, their mixtures and the like. These compositions are useful in specific applications such as padding, spraying, coating and the like.

When the treating agents have one or more available reactive hydrogens in the phenol of the hydroxyl containing compound, they can be alkylolated with an aldehyde or precursor of the type previously described to obtain alkylol derivatives which are also useful as treating agents. Likewise available reactive hydrogen atoms attached to the nitrogen atoms in the urethane group can also be alkylolated by use of aldehyde or its precursors. Thus, aldehydes and precursors of the types previously described can be introduced in amounts up to that amount needed to react with all of the available reactive hydrogens in the phenol and in the urethane groups. After the aldehyde addition, reaction at temperatures of from 5° C. to 110° C. which are maintained for, e.g., one to twenty hours, is carried out. When desired, these alkylolated derivatives can also be used with acids, surfactants, solvents, epoxides and the like to produce useful treating agent compositions. The acids, surfactants, solvents and epoxides described above can be employed in these compositions.

Preparation of the hydroxyl containing nitrogen compounds, prepolymers, reaction products of these compounds with prepolymers, reaction products of aldehydes with these compounds and other reaction products of these compounds are generally carried out at atmospheric pressure. The prepolymer preparations are carried out under a nitrogen blanket to provide anhydrous conditions during reaction or if desired, any other inert anhydrous gas may be employed as a gas blanket to provide anhydrous conditions. Optionally, a nitrogen blanket can be used in the reaction between the prepolymer and hydroxyl containing nitrogen compound.

The treating agents and the compositions described above are unique urethane compositions in that they do not react with water, can be applied from aqueous or solvent systems and can be crosslinked or cured when exposed to heat. When desired, curing times and curing temperatures can be reduced by the use of catalysts such as ammonium chloride, dimethyl phosphite, mixed butyl phosphate ester acids and other chemical materials which produce acids on heating. The absence of water-sensitivity of these treating agents makes them particularly suitable for use in applications where the treating agents are applied from aqueous media to fibrous, porous and nonporous substrates. The treating agents have the added advantage that they are compatible with a variety of other film forming polymeric materials such as acrylates, aminoplast resin and the like and can be used in conjunction with these other film forming compositions.

APPLICATIONS

When the treating agent compositions disclosed in this invention are applied to fibrous, porous and nonporous substrates, they enhance the properties of these substrates. For example, applications of these compositions to fibers results in improved pigment binding, dyeability, abrasion, adhesion, elongation, flexibility and antistatic properties. The treating agent compositions are also useful as bond coatings for fibers. Likewise these treating agent compositions can be used in leather retaining to produce leather having excellent finishing characteristics. They are also useful in the impregnation of leather. The treating agent compositions can also be used in the bonding of substrates such as metals, wood and the like. These various applications are described in greater detail below.

Treating agent compositions useful in treating fibers, textiles and the like include compositions wherein (1) the treating agent is the reaction product of a hydroxyl containing nitrogen compound which is the reaction product of a phenol, at least one aldehyde or aldehyde precursor and at least one monoalkanolamine or dialkanolamine wherein the alkylene group in the alkanolamine has at least two carbon atoms and a prepolymer having at least one unreacted isocyanate group which is the reaction product of an organic polyisocyanate and at least one polyoxyalkylene polyol or a polyester having at least two terminal hydroxyl groups, (2) from about 0 to 20 percent by weight of the treating agent in the composition of an organic acid containing from one to four carbon atoms, (3) from about 0 to 20 percent by weight of the treating agent of a surfactant, (4) from about 0 to 20 percent by weight of the treating agent of an epoxide having at least eight carbon atoms, (5) from about 0 to 80 percent by weight of the treating agent of a pigment, and (6) from about 0 to 99 percent by weight of the treating agent of a solvent such as water, alcohols, chlorinated hydrocarbons and aromatic hydrocarbons. The above treating agent compositions also include compositions of treating agents in which the hydroxyl containing compound has been further reacted with an aldehyde or precursor as described previously prior to its reaction with the prepolymer and include the treating agent further reacted with an aldehyde or precursor thereof as previously described.

The treating agent compositions of this invention are employed in the coloration and pigmentation of cotton, wool, other natural fibers, man-made fibers, synthetic fibers, glass fibers and blends of these fibers. They can be applied by various means such as padding, dipping, spraying or the like. The amount of compositions which is applied to the fiber will depend on the properties of the fiber as well as the particular application for which the composition is to be used. If desired, the treating agent composition can be applied to the fiber in a colorless form, that is, a composition which is free of pigment, cured and subsequently dyed. The temperature at which the treating agent composition is applied is not critical and is usually in the range of from 20° to 110° F.

After the treating agent composition is applied as a coating on fibers or fabrics, the coated fiber or fabric is dried at 30° to 300° F. and then cured by passage through a curing oven maintained at a temperature of from 200° to 450° F. preferably from 225° to 425° F. The residence time in the curing oven is from one to one hundred and twenty minutes and preferably from two to five minutes. The optimum temperature and residence time in the curing oven can readily be determined by placing samples of the treated fiber or fabric in the oven and heating them for given periods of time to determine when satisfactory curing of the coating on the substrate occurs. From 0.1% to 30% of the cured treating agent composition based on the weight of the fiber can be used. Usually concentrations of 1 to 15% of treating agent or treating agent composition based on the weight of the fiber are preferred.

When treating agent compositions are employed as pigment binders, the pigment is usually dispersed in an aqueous solution or dispersion of the treating agent composition and the resulting dispersion is applied to the fiber or fabric, dried and cured. The treating agent compositions disclosed in this invention can be used to bind pigments such as C.I. RB 10 carbon black, C.I. RB 31 iron oxide red, C.I. RB 40 phthalocyanine green, C.I. RB 51 chrome orange, C.I. RB 54 molybdate orange, C.I. RB 81 titanium dioxide, C.I. RB 98 cadmium yellow and the like. Other types of pigments can also be used. The concentrations of pigment and treating agent used in this application will vary depending on the amount of pigmentation desired and the type of coating. Generally the concentration of pigment will be from 0.01% to 40% based on the weight of the treating agent in the composition. However, in protective coatings pigment concentrations as high as 80% based on the weight of treating agent can be used.

If desired, the treating agent compositions which are free of pigment can be used to form colorless coatings on fibers or fabrics. These coatings are dried, cured and then dyed by conventional methods. Acid dyes such as C.I. Acid Yellow 40 C.I. 18,950 (Fast Yellow 2GC), C.I. Acid Yellow 116 (Cibalan Yellow GRL), C.I. Acid Yellow 118 (Vialon Fast Yellow G), C.I. Acid Red 114 (Benzyl Red BR), C.I. Acid Red 225 (Vialon Fast Red B), C.I. Acid Red 251 (Cibalan Bordeaux EL), C.I. Acid Blue 170 (Cibalan Blue BRL), C.I. Acid Blue 209 (Vialon Fast Blue FFG), C.I. Acid Black 61 (Vialon Fast Blue Grey B) and the like can be used to dye these coatings. The concentration of dye employed will depend upon the particular shade desired. Generally the concentration will depend upon the particular shade desired. Generally the concentration of dye will be from 0.01% to 5% based on the weight of fiber with the preferred concentrations being from 0.01% to 4% based on the weight of fiber. The concentrations of treating agent compositions which are employed as coatings will be in the same range as those described above for pigment binding.

If desired, metal salts such as basic aluminum acetate, zirconium acetate, Werner-type reactive chromium complexes (e.g. Quillon) and the like which decompose on heating to form mordants can be mixed with treating agent compositions. Such complexes include stearato chromic chloride and other complex compounds such as those described in U.S. Patent No. 2,273,040, granted Feb. 17, 1942. These mixtures can be applied to fabrics or fibers, dried and cured to form coatings which contain mordants. The presence of these mordants in the cured coatings greatly facilitates dyeing with dyestuffs such as acid dyestuffs and the like. Normally these complexes are applied from aqueous solutions in concentrations of from about 1% to 5% by weight with the preferred concentration being about 2% to 4% based on the weight of fiber.

These treating agent compositions are also useful in improving antistatic properties and abrasion resistance of fibers and fabrics. The compositions are applied to fibers and fabrics, dried and cured in the same manner as the pigment binding and dyeing applications described above. Fibers and fabrics treated with these compositions exhibit improved antistatic properties and abrasion resistance.

Treating agent compositions can also be used as bond coatings and tie bond coatings on fiber glass. The treating agents are applied, dried and cured by the procedures described above. When the compositions are used for bond coatings on fiber glass, the cured coating of treating agent composition on the fiber glass is dip coated with a resorcinol formaldehyde coating and then molded with rubber to produce a rubber to fiber glass bond. When the compositions are used as tie bond coatings for fiber glass roving, a coating of treating agent composition is applied to the fiber glass and cured to form a tie bond coating. A polyester coating is then applied to the tie bond coating on the fiber and cured with a free radical catalyst.

Treating agent compositions useful in the treatment of leather include compositions wherein (1) the treating agent is the reaction product of a hydroxyl containing nitrogen compound which is the reaction product of a phenol, at least one aldehyde or aldehyde precursor and at least one monoalkanolamine or dialkanolamine wherein the alkylene group in the alkanolamine has at least two carbon atoms and a prepolymer having at least one unreacted isocyanate group which is the recation product of an organic polyisocyanate and at least one polyoxyalkylene polyol or polyester having at least two terminal hydroxyl groups, (2) from about 0 to 20 percent by weight of the treating agent in the composition of an organic acid containing from one to four carbon atoms, (3) fom about 0 to 20 percent by weight of the treating agent of a surfactant, (4) from about 0 to 99 percent by weight of the treating agent of an anionic tanning agent and (5) from about 0 to 99 percent by weight of the treating agent of a solvent such as water, alcohols, chlorinated hydrocarbons and aromatic hydrocarbons. The above treating agent compositions also include compositions of treating agents in which the hydroxyl containing compound has been further reacted with an aldehyde or precursor as described previously prior to its reaction with the prepolymer and include the treating agent further reacted with an aldehyde or precursor thereof as described previously, as well as when the reaction product of the hydroxyl containing nitrogen compound and the prepolymer has been further reacted with an alcohol or a prepolymer.

The treating agent compositions disclosed in this invention are particularly useful in leather tanning operations. They can be used to produce retanned leathers having good break, excellent temper and tight grain. In retanning leather, hides which have been chrome tanned, split and shaved are used. Sides of leather vary in fiber density. There are looser areas, particularly in flank sections where the fibers are long and less dense. The leather sides are retanned to upgrade the leather and to improve its quality and uniformity, that is, to fill and firm up looser areas.

The treating agent compositions can be used in both two-step and one-step retanning processes. In a typical two-step retanning process, a composition of the agent is applied so that 0.1 to 15% by weight of the treating agent based on the weight of leather will be absorbed in the pores of the leather. Usually chrome tanned stock containing 50% water based on its wrung, split shaved weight is employed. The leather is then treated with a second solution containing an anionic tanning agent so that from 0.1 to 15% by weight of the anionic treating agent based on the weight of the leather is absorbed in the pores of the leather and the anionic tanning agent will interreact with the cationic treating agent in situ in the leather to fill the pores. In a typical one-step retanning process, leather is treated with a composition of a treating agent and an anionic tanning agent so that from 0.1 to 30% by weight of the reaction product of the treating agent and anionic tanning agent based on the weight of leather will be absorbed and fill the pores. The treating agent compositions disclosed in this invention produce excellent results in both of these retanning processes.

As examples of anionic agents which may be used in both the two-step and the one-step processes for retanning, there may be mentioned naphthalene sulfonic acid and formaldehyde condensation products, sulfonated formaldehyde phenol condensation products, condensation products of sulfonated phenol and formaldehyde, sulfonated products of dihydroxyphenyl sulfone, sulfonated products of dihydroxydiphenyl propane, preferably in the form of omega sulfonate forms, sulfonated dihydroxydiphenyl methane, phenolic derivatives possessing a urea-formaldehyde condensation bridge or any resin intermediate as a bridge formation, lignin sulfonates, vegetable tannins such as wattle extract solubilized by sodium bisulfite, quebracho extract solubilized by sodium bisulfite, synthetic tannings known as extract tannins and having at least one sulfo radical and the like.

These anionic agents include exchange tannins and auxiliary tanning agents in general. Such tannins include those having sulfo groups and anionic complexes of phenol, cresol, xylenol, naphthol, catechol, resorcinol, naphthalene, anthracene and benzidine with a methylene, sulfone, propane or sulfonimid bridge. Illustrative examples of these compounds are: disulfo dinaphthol methane, disulfo dinaphthyl methane, monosulfo dihydroxy diphenyl methane, a complex reaction product formed by reacting monosulfo dihydroxy diphenyl methane with formaldehyde to give the formula:

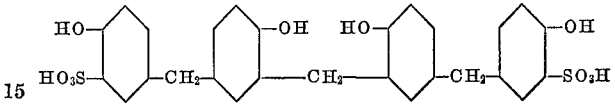

Omega sulfonate of dihydroxy dimethyl diphenyl sulfone, omega sulfonate of dihydroxy diphenyl sulfone, omega sulfonate of dihydroxy diphenyl propane, disulfo dihydroxy diphenyl propane, disulfo dihydroxy diphenyl sulfone, and complex compounds containing a benzidine radical with a sulfonimide-bridge as illustrated by the following compound can also be used:

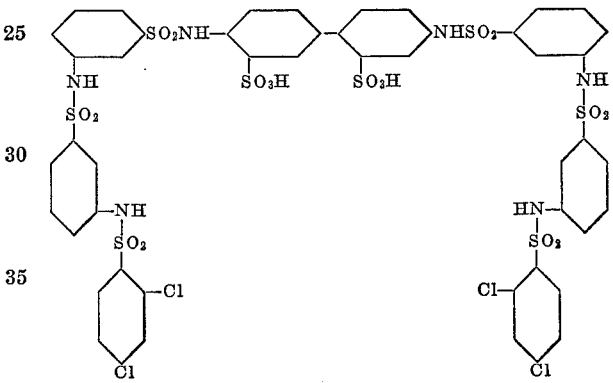

The treating agents disclosed in this invention are also useful in leather impregnation. Compositions containing from 0.1 to 30% of the treating agent based on the weight of leather are prepared by diluting the treating agent with alcohol or alcohol-water mixtures. These compositions are used to impregnate and condition leather which has previously been fat-liquored. Excellent penetration of the leather with these compositions are obtained and no evidence of tackiness is noted after the impregnated leather has been dried. These compositions can be applied as spray coatings, curtain coatings or by drum applications. Chrome tanned leather as well as vegetable tanned leather can be impregnated with these compositions.

Normally retanning operations are carried out at temperatures from 40° to 125° F. for periods of time ranging from one to four hours. Leather impregnation operations are usually carried out at 40° to 100° F. Drying operations are carried out by conventional methods.

Treating agent compositions useful in bonding substrates include compositions containing (1) a treating agent, (2) from 0 to two moles per mole of said treating agent of a hydroxyl containing nitrogen compound and (3) from 0 to two moles of an epoxide per mole of said treating agent containing at least eight carbon atoms. The above treating agent compositions also include compositions of treating agents in which the hydroxyl containing compound has been further reacted with an aldehyde or precursor as described previously prior to its reaction with the prepolymer and include the treating agent further reacted with an aldehyde or precursor thereof as described previously. It is to be understood that each alkanol radical in the hydroxyl containing nitrogen compound should be interreacted with a reactive isocyanate group in the prepolymer to obtain a high viscosity product or gel. The interreaction of alkanol radicals with reactive isocyanate groups is described in greater detail above.

Typical bonding compositions include for example: (a) a treating agent which is the reaction product of one mole of prepolymer having two reactive isocyanates and one mole of hydroxyl containing nitrogen compound having two alkanol radicals; (b) one mole of treating agent of relatively high viscosity, two moles of an epoxide and two moles of hydroxyl containing nitrogen compound; (c) one mole of treating agent and two moles of epoxide and (d) a treating agent which is the reaction product of three moles of prepolymer having two reactive isocyanate groups, one mole of epoxide which on reaction with phenolic hydroxy groups form an addition product having two alkanol radicals and two moles of hydroxyl containing nitrogen compound having two alkanol radicals. Epoxides such as dicyclopentadiene dioxide, limonene dioxide, 3,4 - epoxy - 6 - methylcyclohexylmethyl-3,4 - epoxy - 6 - methylcyclohexanecarboxylate and the like may be used. The diepoxide of the diglycidyl derivative of 4,4' - dihydroxy-diphenyl-dimethyl methane are particularly useful in the above compositions. These epoxides are capable of forming addition products with phenolic hydroxy groups and hydroxyl groups present in the hydroxyl containing nitrogen compound. The compositions are useful in preparing wood-to-wood bonds, metal-to-metal bonds, wood-to-metal bonds and the like. Such bonding compositions may be employed as adhesives or sealants depending on their cured properties. Generally, these compositions are applied to the substrate to be bonded and cured at temperatures from 40° F. to 425° F. for periods of time from fifteen minutes to twenty-five hours and at pressures from atmospheric to 30 lbs. per square inch.

For a fuller understanding of the nature and objects of this invention, reference may be made to the following examples which are given merely to illustrate the invention and are not to be construed in a limiting sense.

EXAMPLE I

(A) Preparation of a hydroxyl containing nitrogen compound 210 g. of diethanolamine and 60 g. of water were changed into a glass flask equipped with agitator, reflux condenser and having provisions for external heating and cooling. This mixture was cooled to 8° C. and a solution containing 163 g. of formaldehyde (37% active and adjusted to a pH of 8.0 to 8.2 with 30° Bé. sodium hydroxide) and 195 g. of water was added to the diethanolamine solution over ninety minutes. The temperature was maintained at 8° to 10° C. during this addition. A solution containing 94 g. of phenol and 20 g. of water was then added to the charge over twenty minutes while the temperature was maintained below 10° C. The reaction mixture was stirred for an additional hour at 10° C., heated to 60° C. and stirred for two hours at 60° to 65° C. to complete reaction. The resulting product, which was the hydroxyl containing nitrogen compound, was then vacuum distilled to remove water. Vacuum distillation was continued until a pot temperature of 110° C. was reached and the water content of the resulting nitrogen compound was less than 0.12%.

(B) Preparation of a prepolymer 258 g. of tolylene diisocyanate was charged to a glass flask equipped with agitator, external heating and cooling facilities as well as provisions for maintaining a nitrogen blanket over the reactants to maintain anhydrous conditions during reaction and 742 g. of a polyethylene glycol having a molecular weight of 1000 was added to the tolylene diisocyanate under nitrogen over a period of thirty minutes while agitating and maintaining the reaction temperature at 45° to 55° C. After addition was complete, the reactants were heated to 70° C. and held at 70° to 75° C. until the isocyanate content of the prepolymer was between 6.0 and 6.5% by weight.

(C) Preparation of a treating agent 65.1 g. of the prepolymer obtained in part (B) above was charged into a glass flask equipped with agitator and heated with agitation to 65° C. 36.4 g. of the hydroxyl containing nitrogen compound obtained in part (A) above was charged to a second glass flask equipped with an agitator and heated to 65° C. The heated prepolymer was slowly added over thirty minutes to the heated hydroxyl containing nitrogen compound in the second glass flask while the reaction temperature was maintained at 65° C. and agitation was continued to obtain uniform mixing and reaction. After addition was complete, the mixture was heated to 90° C. and maintained at 90° to 95° C. for ninety minutes to complete reaction thereby forming the treating agent. The treating agent was then cooled to 30° C. Thereafter, 6.0 g. of glacial acetic acid (99% active) was added to the treating agent with agitation and agitated until a uniform composition was obtained. This composition was diluted with de-ionized water to adjust the active content of the treating agent to 50% by weight.

EXAMPLE II

(A) Preparation of a hydroxyl containing nitrogen compound 61 g. of monoethanolamine and 30 g. of water were charged into a glass flask equipped with agitator, reflux condenser and having provisions for external heating and cooling. This mixture was cooled to 8° C. and a solution containing 81.5 g. of formaldehyde (37% active and adjusted to a pH of 8.0 to 8.2 with 30° Bé. sodium hydroxide) and 210 g. of water was added to the monoethanolamine solution over ninety minutes. The temperature was maintained at 8° C. to 10° C. during this addition. A solution containing 94 g. of phenol and 20 g. of water was then added to the charge over twenty minutes while the temperature was maintained below 10° C. The reaction mixture was stirred for an additional hour at 10° C., heated to 65° C. and stirred for two hours at 65° C. to complete reaction. The resulting product which was the hydroxyl containing nitrogen compound was then heated under vacuum to remove water by distillation. Vacuum distillation was continued until a pot temperature of 110° C. was reached and the water content of the resulting hydroxyl containing nitrogen compound in the flask was less than 0.12%.

(B) Preparation of a prepolymer 258 g. of tolylene diisocyanate was charged into a glass flask equipped with agitator, external heating and cooling facilities as well as provisions for maintaining a nitrogen blanket over the reactants to maintain anhydrous conditions during reaction and 742 g. of a polyethylene glycol having a molecular weight of 1000 was added to the tolylene diisocyanate under nitrogen over a period of thirty minutes while agitating and maintaining the reaction temperature within the range of 45° to 55° C. After addition was complete, the reactants were heated to 70° C. and held at 70° to 75° C. until the isocyanate content of the prepolymer was between 6.0 and 6.5% by weight.

(C) Preparation of a treating agent 192.3 g. of the prepolymer obtained in part (B) above was charged under nitrogen into a glass flask equipped with agitator and heated with agitation to 65° C. 63.3 g. of the hydroxyl containing nitrogen compound obtained in part (A) above was charged into a second glass flask equipped with an agitator and heated to 65° C. The heated prepolymer was slowly added over thirty minutes to the heated hydroxyl containing nitrogen compound under nitrogen in the second glass flask while the reaction temperature was maintained at 65° C. and agitation was continued to obtain uniform mixing and reaction. After addition was complete, the mixture was heated to 95° C. and maintained at 90° to 95° C. for ninety minutes to complete reaction thereby forming the treating agent. The treating agent was then cooled to 30° C. Thereafter, 18 g. of glacial acetic acid (99%) active was added to the treating agent with agitation and the mixture agitated until a uniform composition was obtained. This composition was diluted with 273.6 g. of de-ionized water to adjust the active content of the treating agent to 50% by weight.

EXAMPLE III

(A) Preparation of a hydroxyl containing nitrogen compound 210 g. of a diethanolamine and 60 g. of methanol were charged into a glass flask equipped with agitator, reflux condenser and having provisions for external heating and cooling. This mixture was cooled to 8° C. and a solution containing 163 g. of formaldehyde (37% active and adjusted to a pH of 8.0 to 8.2 with 30° Bé. sodium hydroxide) and 100 g. of methanol was added to the diethanolamine solution over ninety minutes. The temperature was maintained at 8° to 10° C. during this addition. A solution containing 94 g. of phenol and 20 g. of methanol was then added to the charge over twenty minutes while the temperature was maintained below 10° C. The reaction mixture was stirred for an additional hour at 10° C., heated to 60° C. and stirred for two hours at 60° to 65° C. to complete reaction. The resulting product which was the hydroxyl containing nitrogen compound was then vacuum distilled to remove water. Vacuum distillation was continued until a pot temperature of 110° C. was reached and the water content of the resulting nitrogen compound was less than 0.12%.

(B) Preparation of a prepolymer 516 g. of tolylene diisocyanate was charged into a glass flask equipped with agitator, external heating and cooling facilities as well as provisions for maintaining a nitrogen blanket over the reactants to maintain anhydrous conditions during reaction and 1484 g. of a polyethylene glycol having a molecular weight of 1000 was added to the diisocyanate under nitrogen over a period of thirty minutes while agitating and maintaining the reaction temperature within the range of 45° to 55° C. After addition was complete, the reactants were heated to 70° C. and held at 70° to 75° C. until the isocyanate content of the prepolymer was between 6.0 and 6.5% by weight.

(C) Preparation of a treating agent 130.2 g. of the prepolymer obtained in part (B) above and 65.6 g. of the hydroxyl containing nitrogen compound obtained in part (A) above was charged into a flask equipped with an agitator and heated with agitation to 105° C. The reaction mixture was heated at 105° C. to 135° C. for ninety minutes to complete reaction and then cooled to 25° C. 207.8 g. of water and 12 g. of glacial acetic acid (99% active) were added to the treating agent with agitation and agitated until a uniform composition was obtained.

EXAMPLE IV

(A) Preparation of a hydroxyl containing nitrogen compound 630 g. of diethanolamine and 170 g. of methanol were charged into a glass flask equipped with agitator, reflux condenser and having provisions for external heating and cooling. This mixture was cooled to 8° C. and a solution containing 489 g. of formaldehyde (37% active and adjusted to a pH of 8.0 to 8.2 with 30° Bé. sodium hydroxide) was added to the diethanolamine solution over ninety minutes. The temperature was maintained at 8° to 12° C. during this addition. A solution containing 188 g. of phenol and 60 g. of water was then added to the charge over fifteen minutes while the temperature was maintained at 10° to 25° C. The reaction mixture was cooled to 10° C., stirred for an hour at 10° C., heated to 60° C. and stirred for two hours at 60° to 65° C. to complete reaction. The resulting product which was the hydroxyl containing nitrogen compound was then vacuum distilled to remove water. Vacuum distillation was continued until a pot temperature of 110° C. was reached and the water content of the resulting nitrogen compound was less than 0.12%.

(B) Preparation of a prepolymer 257 g. of tolylene diisocyanate was charged into a glass flask equipped with agitator, external heating and cooling facilities as well as provisions for maintaining a nitrogen blanket over the reactants to maintain anhydrous conditions during reaction. 743 g. of a polypropylene glycol having a molecular weight of 1025 was added to the diisocyanate under nitrogen over a period of thirty minutes while agitating and maintaining the reaction temperature within the range of 45° to 55° C. After addition was complete, the reactants were heated to 75° C. and held at 75° to 80° C. until the isocyanate content of the prepolymer was between 6.0 and 6.4% by weight.

(C) Preparation of a treating agent 666.6 g. of the prepolymer obtained in part (B) above was charged into a glass flask equipped with agitator and heated with agitation to 65° C. 445 g. of the hydroxyl containing nitrogen compound obtained in part (A) above was charged to a second glass flask equipped with an agitator and heated to 65° C. The heated prepolymer was slowly added over thirty minutes to the heated hydroxyl containing nitrogen compound in the second glass flask while the reaction temperature was maintained at 65° C. and agitation was continued to obtain uniform mixing and reaction. After addition was complete, the mixture was heated to 90° C. and maintained at 90° to 95° C. for ninety minutes to obtain the treating agent.

EXAMPLE V

(A) Preparation of a hydroxyl containing nitrogen compound 315 g. of diethanol and 60 g. of methanol were charged into a glass flask equipped with agitator, reflux condenser and having provisions for external heating and cooling. This mixture was cooled to 10° C. and a solution containing 244.5 g. of formaldehyde (37% active and adjusted to a pH of 8.0 to 8.2 with 30° Bé. sodium hydroxide) was added over sixty minutes. The temperature was maintained at 10° C. to 15° C. during this addition. A solution containing 282 g. of phenol and 25 g. of methanol was then added to the charge over fifteen minutes while the temperature was maintained below 22° C. The reaction mixture was stirred for an additional hour at 22° C., heated to 65° C. and stirred for two hours at this temperature to complete reaction. The resulting product, which was the hydroxyl containing nitrogen compound, was then heated under vacuum to remove water and methanol by distillation. Vacuum distillation was continued until a pot temperature of 110° C. was reached and the water content of the resulting hydroxyl compound in the flask was less than 0.12%.

(B) Preparation of a prepolymer 367.1 g. of tolylene diisocyanate was charged into a glass flask equipped with agitator, external heating and cooling facilities as well as provisions for maintaining a nitrogen blanket over the reactants to maintain anhydrous conditions during reaction and 632 g. of a polyethylene glycol having a molecular weight of 600 was added to the diisocyanate under nitrogen over a period of thirty minutes while agitating and maintaining the reaction temperature within the range of 45° C. to 55° C. After addition was complete, the reactants were heated to 80° C. and held at 80° to 85° C. until the isocyanate content of the prepolymer was between 8.25 and 8.85% by weight.

(C) Preparation of a treating agent 450 g. of the prepolymer obtain in part (B) above was charged into a glass flask equipped with agitator and heated with agitation to 65° C. 180.8 g. of the hydroxyl containing nitrogen compound obtained in part (A) above was charged into a second glass flask equipped with an agitator and heated to 65° C. The heated prepolymer was slowly added over thirty minutes to the heated hydroxyl containing compound in the second glass flask while the reaction temperature was maintained at 65° C. and agitation was continued to obtain uniform mixing and reaction. After addition was complete, the mixture was heated to 95° C. and maintained at 95° to 100° C. for ninety minutes to complete reaction. The treating agent is cooled to 65° C. and 94.2 g. of a 55% solution of formaldehyde in methanol was added to the treating agent with agitation at 60° to 65° C. over two and one-half hours. This treating agent was diluted with 249.3 g. of isopropanol (99% active) and 25.7 g. of 2-methoxyethanol to obtain a treating agent composition.

EXAMPLE VI

(A) Preparation of a hydroxyl containing nitrogen compound 315 g. of diethanolamine and 60 g. of methanol were charged into a glass flask equipped with agitator, reflux condenser and having provisions for external heating and cooling. This mixture was cooled to 10° C. and a solution containing 244.5 g. of formaldehyde (37% active and adjusted to a pH of 8.0 to 8.2 with 30° Bé sodium hydroxide) was added to the diethanolamine solution over sixty minutes. The temperature was maintained at 10° C. to 15° C. during this addition. A solution containing 282 g. of phenol and 25 g. of methanol was then added to the charge over fifteen minutes while the temperature was maintained below 22° C. The reaction mixture was agitated for an additional hour at 22° C., heated to 65° C. and stirred for two hours at this temperature to complete reaction. The resulting product which was the hydroxyl containing nitrogen compound was then heated under vacuum to remove water and methanol by distillation. Vacuum distillation was continued until a pot temperature of 110° C. was reached and the water content of the resulting hydroxyl containing compound in the flask was less than 0.12%.

(B) Preparation of a prepolymer 257 g. of tolylene diisocyanate was charged into a glass flask equipped with agitator, external heating and cooling facilities as well as provisions for maintaining a nitrogen blanket over the reactants to maintain anhydrous conditions during reaction. 743 g. of a polypropylene glycol having a molecular weight of 1025 was added to the diisocyanate under nitrogen over a period of thirty minutes while agitating and maintaining the reaction temperature within the range of 45° to 55° C. After addition was complete, the reactants were heated to 75° C. and heated at 75° to 80° C until the isocyanate content of the prepolymer was between 6.0 and 6.4% by weight.

(C) Preparation of a treating agent 540 g. of the prepolymer obtained in part (B) above was charged into a glass flask equipped with agitator and heated with agitation to 65° C. 165.5 g. of the hydroxyl containing nitrogen compound obtained in part (A) above was charged into a second glass flask equipped with an agitator and heated to 65° C. The heated prepolymer was slowly added over thirty minutes to the heated hydroxyl containing nitrogen compound in the second glass flask while the reaction temperature was maintained at 65° C. and agitation was continued to obtain uniform mixing and reaction. After addition was complete, the mixture was heated to 95° C. and maintained at 95° to 100° C. for ninety minutes to complete reaction. The reaction product was then cooled to 55° C. and 47.1 g. of trioxane was added with agitation. After the trioxane had dissolved, 47.1 g. of glacial acetic acid was added to catalyze the condensation of formaldehyde with the reaction product. This mixture was agitated at 55° C. for one hour to complete condensation and to form the treating agent. The resulting treating agent was then diluted with 200 g. of 2-methoxyethanol to produce a composition containing 80% by weight of the treating agent. It had a Brookfield viscosity of 8500 cps. at 25° C. with a No. 3 spindle at a speed of 12 r.p.m.

EXAMPLE VII

(A) Preparation of a hydroxyl containing nitrogen compound 315 g. of diethanolamine and 60 g. of methanol were charged into a glass flask equipped with agitator, reflux condenser and having provisions for external heating and cooling. This mixture was cooled to 10° C. and a solution containing 244.5 g. of formaldehyde (37% active and adjusted to a pH of 8.0 to 8.2 with 30° Bé. sodium hydroxide) was added to the diethanolamine solution over sixty minutes. The temperature was maintained at 10° C. to 15° C. during this addition. A solution containing 282 g. of phenol and 25 g. of methanol was then added to the charge over fifteen minutes while the temperature was maintained at 22° C. The reaction mixture was stirred for an additional hour at 22° C., heated to 65° C. and stirred for two hours at this temperature to complete reaction. The resulting product which was the hydroxyl containing nitrogen compound was then heated under vacuum to remove water and methanol. Vacuum distillation was continued until a pot temperature of 110° C., was reached and the water content of the resulting hydroxyl containing compound in the flask was less than 0.12%.

(B) Preparation of the prepolymer 257 g. of tolylene dissocyanate was charged into a glass flask equipped with agitator, external heating and cooling facilities as well as provisions for maintaining a nitrogen blanket over the reactants to maintain anhydrous conditions during reaction. 743 g. of polyproylene glycol having a molecular weight of 1025 was added to the tolylene diisocyanate under nitrogen over a period of thirty minutes while agitating and maintaining the reaction temperature within the range of 45° to 55° C. After addition was complete, the reactants were heated to 75° C. and held at 75° to 80° C. until the isocyanate content of the prepolymer was between 6.0 and 6.4% by weight.

(C) Preparation of a treating agent 502.4 g. of the prepolymer obtained in part (B) above was charged into a glass flask equipped with agitator and heated with agitation to 65° C. 153.9 g. of the hydroxyl containing nitrogen compound obtained in part (A) above was charged into a second glass flask equipped with an agitator and heated to 65° C. The heated prepolymer was slowly added over thirty minutes to the heated hydroxyl containing nitrogen compound in the second glass flask while the reaction temperature was maintained at 65° C. and agitation was continued to obtain uniform mixing and reaction. After addition was complete, the mixture was heated to 95° C. and maintained at 95° to 100° C. for ninety minutes to complete reaction. It was then cooled to 65° C. and 80.3 g. of a 55% solution of formaldehyde in methanol was added with agitation and the mixture agitated at 60° to 65° C. for two and one-half hours to obtain the treating agent. The treating agent was diluted with 241.5 g. isopropanol and 21.9 g. of 2-methoxyethanol to produce a treating agent composition. This composition was found to be readily soluble in isopropanol.

EXAMPLE VIII (A) Preparation of a hydroxyl containing nitrogen compound

A mixture of 315 g. of diethanolamine and 60 g. of methanol was charged into a glass flask equipped with agitator, reflux condenser and having provisions for external heating and cooling. The mixture was cooled to 10° C. and 24.5 g. of formaldehyde (37% active) was added slowly over one hour while the reaction mixture was agitated and maintained at a temperature of 10° to 15° C. After addition was complete, a mixture of 282 g. of phenol and 25 g. of methanol was added with vigorous agitation over fifteen minutes while the reaction temperature was maintained at 18° to 22° C. The reaction mixture was agitated at 18° to 22° C. for one hour, heated to 65° C. and agitated for two hours at 65° C. to complete reaction. The resulting product which was the hydroxyl containing nitrogen compound was vacuum distilled to remove water, methanol and other volatiles. Vacuum distillation was continued until a pot temperature of 100° C. was reached. The product was then heated under vacuum at 100° C. for fifteen minutes and cooled to 30° C. Analysis showed the water content of the hydroxy containing nitrogen compound was 0.5% by weight.

(B) Preparation of a prepolymer 258 g. of tolylene diisocyanate was charged into a glass flask equipped with agitator, external heating and cooling facilities as well as provisions for maintaining a nitrogen blanket over the reactants to provide anhydrous conditions during reaction. 742 g. of a polyethylene glycol having a molecular weight of 1000 was added with agitation to the tolylene diisocyanate under nitrogen over thirty minutes while the reaction temperature was maintained at 45° to 55° C. After this addition was complete, the reaction mixture was heated to 70° C. and held at 70° to 75° C. until analysis showed the isocyanate content of the prepolymer was between 6.0 and 6.5% by weight.

(C) Preparation of the treating agent 700 g. of the prepolymer obtained in part (B) above and 211 g. of the hydroxyl containing nitrogen compound obtained in part (A) above were charged into a glass flask equipped with agitator, reflux condenser and provisions for external heating and cooling. This mixture was heated to 65° C. and agitated until uniform. The mixture was then heated with agitation to 90° C. and agitated at 90° to 95° C. for ninety minutes to complete reaction. The product which is the treating agent was then cooled to 70° C. and a treating agent composition was prepared by adding 60 g. of glacial acetic acid (99% active) and 971 g. of water to the treating agent.

EXAMPLE IX (A) Preparation of a hydroxyl containing nitrogen compound

A mixture of 315 g. of diethanolamine and 60 g. of methanol was charged into a glass flask equipped with agitator, reflux condenser and having provisions for external heating and cooling. This mixture was cooled to 10° C. and 244.5 g. of formaldehyde (37% active) was added slowly over one hour while agitating the reaction mixture and maintaining the reaction temperature between 10° and 15° C. After this addition was complete, a mixture of 282 g. of phenol and 25 g. of methanol was added over fifteen mintues at 18° to 22° C. with vigorous agitation. The reaction mixture was agitated for one hour at 18° to 22° C., heated to 65° C. and agitated for two hours at 65° C. to complete reaction. The resulting product, which was the hydroxyl containing nitrogen compound, was then vacuum distilled to remove water, methanol and other volatile materials. Vacuum distillation was continued until a pot temperature of 110° C. was reached and the product was held under vacuum at 110° C. for one hour. The water content of the nitrogen compound in the flask was less than 0.2% by weight.

(B) Preparation of a prepolymer 257 g. of tolylene diisocyanate was charged into a glass flask equipped with agitator, external heating and cooling facilities as well as provisions for maintaining a nitrogen blanket over the reactants to provide anhydrous conditions during reaction. 743 g. of a polypropylene glycol having a molecular weight of 1025 was added to the tolylene diisocyanate under nitrogen over thirty minutes while agitating and maintaining the reaction temperature between 45° and 55° C. After addition was complete, the mixture was heated to 60° C. and then gradually heated to 75° C. It was heated at 75° to 80° C. until the isocyanate content of the prepolymer was between 6.0 and 6.4% by weight.

(C) Preparation of a treating agent 685 g. of the prepolymer obtained in part (B) above was charged into a glass flask and heated to 65° C. 211 g. of the hydroxyl containing nitrogen compound obtained in part (A) above was added slowly to the prepolymer over thirty minutes at 65° C. The mixture was then heated to 160° C. and held at this temperature for thirty minutes to complete reaction. After reaction was complete, the treating agent was cooled to room temperature.

A composition of the treating agent was prepared by dissolving 87.7 g. of the treating agent in a mixture containing 6 g. of glacial acetic acid, 46.85 g. of water 46.85 g. of isopropanol (99%). This composition was particularly useful in the impregnation of leather particularly when it was diluted with a 1:1 mixture water-isopropanol. The treating agent had an affinity for leather, was water-insoluble and was not readily removed from leather by water.

EXAMPLE X (A) Preparation of a hydroxyl containing nitrogen compound 269 g. of N-methyl monoethanolamine and 71.7 g. of methanol were charged into a glass flask equipped with agitator, reflux condenser and having provisions for external heating and cooling. This mixture was cooled at 10° C. and a solution containing 292.2 g. of formaldehyde (37% active and adjusted to a pH 8.0 to 8.2 with 50° Bé. sodium hydroxide) was added to the N- methyl monoethanolamine solution over ninety minutes while the temperature was maintained at 8° C. to 10° C. during the addition. A solution containing 337.1 g. of phenol and 30 g. of methanol was then added to the charge over five minutes with vigorous agitation while the temperature was maintained below 10° C. Cooling was discontinued and the temperature of the reaction mixture was allowed to rise to 20° C. The reaction mixture was stirred for an additional hour at 20° to 25° C. and heated to 65° C. over two hours. The resulting product, which was the hydroxyl containing nitrogen compound, was then heated under vacuum to remove water and methanol by distillation. Vacuum distillation was continued until a pot temperature of 100° C. was reached. The vacuum distillation was continued for fifteen minutes at 100° C. and the nitrogen compound in the flask was immediately cooled at 25° C. Analysis showed the compound had a water content of less than 0.5% by weight.

(B) Preparation of a prepolymer 257 g. of tolylene diisocyanate was charged into a glass flask equipped with agitator, external heating and cooling facilities as well as provisions for maintaing a nitrogen blanket over the reactants to maintain anyhydrous conditions during reaction. 743 g. of a polypropylene glycol having a molecular weight of 1025 was added to the diisocyanate under nitrogen, over a period of thirty minutes while agitating and maintaining the reaction temperature within the range of 45° to 55 ° C. After addition was complete, the reactants were heated to 80° C. and held at this temperature until the isocyanate content of the prepolymer was between 6.0 and 6.4% by weight.

(C) Preparation of a treating agent 537.4 g. of the prepolymer obtained in part (B) above and 145.8 g. of the hydroxyl containing nitrogen compound obtained in part (A) above were charged into a glass flask equipped with an agitator and reflux condenser as well as provisions for heating and cooling. The reaction mixture was gradually heated to 95° C. and held at 95° C. to 100° C. for ninety minutes to complete reaction. The reaction product was cooled to 65° C. 164.1 g. of formaldehyde (37% active and containing 0.8 g. of 50° Bé. sodium hydroxide) was added at 60° to 65° C. with agitation and heated for two hours at 60° C. to 65° C. to obtain the treating agent. 79.8 g. of 2-methoxyethanol and 23.7 g. of a nonionic emulsifier containing one mole of nonylphenol condensed with nine to ten moles of ethylene oxide were added to the treating agent. This mixture was cooled to 30° C. and 48.4 g. of glacial acetic acid (99% active) added at 25° to 30° C. to obtain a composition of the treating agent.

EXAMPLE XI (A) Preparation of a hydroxyl containing nitrogen compound 233.6 g. of N-ethyl monoethanolamine and 116.3 g. of water were charged into a glass flask equipped with agitator, reflux condenser and having provisions for external heating and cooling. This mixture was cooled to 8° C. and a solution containing 213.9 of formaldehyde (37% active and adjusted to a pH of 8.0 to 8.2 with 30° Bé sodium hydroxide) and 94.4 g. water was added to the N-ethyl monoethanolamine solution over forty-five minutes. The temperature was maintained at 10° C. during this addition. 246.8 g. of phenol and 21.9 of water were added to the charge over forty-five minutes while the temperature was maintained at 25° to 30° C. The reaction mixture was stirred for an additional fifteen minutes at 30° C. and 72.9 g. of methanol was added. This mixture was heated to 65° C. and held at 60° to 65° C. for two hours to complete reaction. The resulting product which was the hydroxyl containing nitrogen compound was then heated under vacuum to remove water and methanol by distillation. Vacuum distillation was continued until a pot temperature of 110° C. was reached and the water content of the resulting nitrogen compound in the flask was less than 0.2% by weight.

(B) Preparation of a prepolymer 632.9 g. of polyethylene glycol having a molecular weight of 600 was charged into a glass flask equipped with agitator, external heating and cooling facilities as well as provisions for maintaining a nitrogen blanket over the reactants to maintain anhydrous conditions during reaction and 367.1 g. tolylene diisocyanate was added to the polyethylene glycol under nitrogen over 10 minutes while agitating and maintaining the reaction temperature at 25° C. After addition was complete, the reactants were then heated to 85° C. and heated at 80° to 85° C. until the isocyanate content of the prepolymer was 8.55% by weight.

(C) Preparation of a treating agent 525 g. of the prepolymer obtained in part (B) above was charged into a glass flask equipped with agitator and heated with agitation to 65° C. 195 g. of the hydroxyl containing nitrogen compound obtained in part (A) above was charged into a second glass flask equipped with an agitator and heated to 65° C. The heated prepolymer was slowly added over thirty minutes to the heated nitrogen compound in the second glass flask while the reaction temperature was maintained at 65° C. and agitation was continued to provide uniform mixing and reaction. After addition was complete, the mixture was heated to 90° C. and heated at 90° to 95° C. for ninety minutes to complete reaction. Thereafter, 163 g. formaldehyde (37% active) was added and the reaction mixture heated at 60° C. for three hours. The resulting treating agent was cooled to 30° C. and 60 g. glacial acetic acid (99% active) and 737 g. water were added to obtain a 50% by weight treating agent composition.

EXAMPLE XII (A) Preparation of a hydroxyl containing nitrogen compound

A mixture of 315 g. of diethanolamine and 60 g. of methanol was charged into a glass flask equipped with agitator, reflux condenser and having provisions for external heating and cooling. This mixture was cooled to 10° C. and 244.5 g. of formaldehyde (37% active) was slowly added with agitation over sixty minutes while the reaction temperature was maintained at 10° to 15° C. After addition was complete, a mixture of 282 g. of phenol and 25 g. of methanol was added with vigorous agitation over fifteen minutes while the reaction temperature was maintained at 18° to 22° C. The reaction mixture was agitated at 18° to 22° C. for one hour, heated to 65° C. and agitated for two hours at 65° C. to complete reaction. The resulting product, which was the hydroxyl containing nitrogen compound, was then vacuum distilled to remove water, methanol and other volatiles. Vacuum distillation was continued until a pot temperature of 100° C. was reached. The product was heated under vacuum at 100° C. for fifteen minutes and then cooled to 30° C. Analysis showed the water content of the hydroxyl containing nitrogen compound was 0.5% by weight.

(B) Preparation of a prepolymer 258 g. of toluene diisocyanate was charged into a glass flask equipped with agitator, external heating and cooling facilities as well as provisions for maintaining a nitrogen blanket over the reactants to provide anhydrous conditions during reaction. 742 g. of a polyethylene glycol having a molecular weight of 1000 was added with agitation to the tolylene diisocyanate under nitrogen over thirty minutes while the reaction temperature was maintained at 45° to 55° C. After addition was complete, the reaction mixture was heated to 70° C. and held at 70° to 75° C. until the isocyanate content of the prepolymer was between 6.0 and 6.5% by weight.

(C) Preparation of a treating agent 700 g. of the prepolymer obtained in part (A) above was charged into a glass flask and heated to 65° C. 211 g. of the hydroxyl containing nitrogen compound obtained in part (A) above was added, with agitation, to the heated prepolymer. This mixture was then heated to 90° C. and heated with agitation at 90° to 95° C. for ninety minutes to complete reaction. After reaction was complete, the mixture was cooled to 70° C. and 324 g. of formaldehyde (37% active by weight) was added at 70° C. with agitation. After this addition was complete, the reaction temperature was maintained at 60° to 65° C. and the mixture agitated for two hours at this temperature to complete reaction. The resulting condensation product, which is a treating agent, was then cooled to 30° C. and diluted with 60 g. of glacial acetic acid (99% active) and 887 g. of water to obtain a composition of the treating agent. This example demonstrates reaction of all available reactive hydrogens in the treating agent with formaldehyde.

EXAMPLE XIII (A) Preparation of a hydroxyl containing nitrogen compound

A mixture of 315 g. of diethanolamine and 60 g. of methanol was charged into a glass flask equipped with agitator, reflux condenser and having provisions for external heating and cooling. The mixture was cooled to 10° C. and 244.5 g. of formaldehyde (37% active) was slowly added with agitation over sixty minutes while the reaction temperature was maintained at 10° to 15° C. After addition was complete, a mixture of 282 g. of phenol and 25 g. of methanol was added with vigorous agitation over fifteen minutes at 18° to 22° C. The reaction mixture was agitated at 18° to 22° C. for one hour, heated to 65° C. and agitated for two hours at 65° C. to complete reaction. The resulting product which was the hydroxyl containing nitrogen compound was vacuum distilled to remove water, methanol and other volatiles. Vacuum distillation was continued until a pot temperature of 100° C. was reached. The product was then heated under vacuum for fifteen minutes at 100° C. and then cooled to 30° C. Analysis showed the water content of the hydroxyl containing compound was 0.5% by weight.

(B) Preparation of a prepolymer 632.9 g. of polyethylene glycol having a molecular weight of 600 was charged into a glass flask equipped with agitator, external heating and cooling facilities as well as provisions for maintaining a nitrogen blanket over the reactants to provide anhydrous conditions during reaction. 367.1 g. of tolylene diisocyanate was charged into the flask containing the glycol under nitrogen over ten minutes. The contents of the flask were agitated and held at 30° C. during this addition. The reaction mixture was then heated with agitation to 80° C. over one hour. The mixture was reacted with agitation at 80° to 85° C. until analysis showed the isocyanate content of the prepolymer was between 8.25 and 8.85% by weight.

(C) Preparation of the treating agent 491 g. of the prepolymer obtained in part (B) above and 211 g. of the hydroxyl containing nitrogen compound obtained in part (A) above were charged into a glass flask and were heated to 65° C. and agitated until a uniform mixture was obtained. The reactants were then heated with agitation to 90° C. and held at 90° to 95° C. for ninety minutes to complete reaction.

After reaction was complete, the mixture was cooled to 70° C. and 163 g. of formaldehyde (37% active by weight and containing 0.5 g. of 50° Bé. sodium hydroxide) was added with agitation at 70° C. The mixture was heated for two hours at 60° to 65° C. to obtain the treating agent. A composition of the treating agent was prepared by adding 60 g. of glacial acetic acid (99% active) and 719 g. of water to the treating agent.

EXAMPLE XIV (A) Preparation of a hydroxyl containing nitrogen compound

A mixture of 315 g. of diethanolamine and 60 g. of methanol was charged a glass flask equipped with agitator, reflux condenser and having provisions for external heating and cooling. The mixture was cooled to 10° C. and 244.5 g. of formaldehyde (37% active) was added slowly over one hour while the reaction mixture was agitated and maintained at a temperature between 10° and 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the hydroxyl containing nitrogen compound was vacuum distilled to remove water, methanol and other volatiles. Vacuum distillation was continued until a pot temperature of 100° C. was reached and the product was held under vacuum at 100° C. for fifteen minutes. The hydroxyl containing compound was then cooled to 30° C. It was found to have a water content of 0.5% by weight.

A total of 422 g. of the hydroxyl containing compound was charged into a glass flask with agitator, reflux condenser and provisions for external heating and cooling. 13.8 g. of 55% formaldehyde in methanol was charged into the flask containing the nitrogen compound. This mixture was heated to 75° C. and held at 75° C. for one hour to complete reaction. The resulting product which was the condensate of the hydroxyl containing nitrogen compound obtained by condensation of 0.125 moles of formaldehyde with each mole of nitrogen compound was then vacuum distilled to remove water, methanol and other volatiles. Vacuum distillation was carried out by heating the condensate from 70° to 100° C. at reduced pressure over thirty minutes. When a pot temperature of 100° C. was reached, the condensate was cooled to room temperature.

(B) Preparation of a prepolymer 257 g. of tolylene diisocyanate was charged into a glass flask equipped with agitator, external heating and cooling facilities as well as provisions for maintaining a nitrogen blanket over the reactants to provide anhydrous conditions during the reaction. 743 g. of polypropylene glycol having a molecular weight of 1025 was added to the tolylene diisocyanate under nitrogen over thirty minutes while agitating at 45° to 55° C. After addition was complete, the reaction mixture was heated to 60° C. and then gradually heated to 80° C. It was held at 80° C. until the isocyanate content of the prepolymer was between 6.0% and 6.4% by weight.

(C) Preparation of a treating agent 685 g. of the prepolymer obtained in part (B) above was charged into a glass flask and heated to 65° C. 211 g. of the hydroxyl containing nitrogen compound condensate obtained in part (A) above was slowly added to the prepolymer over thirty minutes at 65° C. The mixture was heated to 95° C. and held at 95° C. for ninety minutes to complete reaction.

After reaction was complete, the mixture was cooled to 60° C. and 163 g. of formaldehyde (37% active by weight and containing 0.5 g. of sodium hydroxide) was added at 60° to 65° C. with agitation. This mixture was heated for four hours at 60° to 65° C. to obtain the treating agent. 30.5 g. of a nonionic emulsifier containing one mole of nonylphenol condensed with nine to ten moles of ethylene oxide and 100 g. of 2-methoxyethanol were added to the treating agent. This mixture was cooled to 30° C. and 60 g. of glacial acetic acid (99% active) added to produce a composition of the treating agent.

EXAMPLE XV (A) Preparation of a hydroxyl containing nitrogen compound 210 g. of diethanolamine and 630 g. of water were charged into a glass flask equipped with agitator, reflux condenser and having provisions for external heating and cooling. This mixture was cooled to 8° C. and a solution containing 163 g. of formaldehyde (37% active and adjusted to a pH of 8.0 to 8.2 with 30° Bé. sodium hydroxide) and 630 g. of water was added to the diethanolamine solution over one hour. The temperature was maintained at 10° C. during this addition. A solution containing 450 g. of p,p'-isopropylidene-diphenol and 644 g. of methanol was then added to the charge over forty-five minutes while the temperature was maintained at 25° to 30° C. The reaction mixture was stirred for an additional fifteen minutes at 25° to 30° C. heated to 80° C. to reflux and stirred at reflux for two hours to complete reaction. The resulting product which was the hydroxyl containing nitrogen compound was then heated under vacuum to remove water and methanol by distillation. Vacuum distillation was continued until a pot temperature of 110° C. was reached and the water content of the resulting nitrogen compound in the flask was less than 0.2% by weight.

(B) Preparation of a prepolymer 250 g. of tolylene diisocyanate was charged into a glass flask equipped with agitator, external heating and cooling facilities as well as provisions for maintaining a nitrogen blanket over the reactants to maintain anhydrous conditions during reaction and 742 g. of a polyethylene glycol having a molecular weight of 1000 was added to the tolylene diisocyanate under nitrogen over a period of thirty minutes while agitating and maintaining the temperature within the range of 45° to 55° C. After addition was complete, the reactants were heated to 70° C. and heated at 70° C. to 75° C. until the isocyanate content of the prepolymer was between 6.0 and 6.5% by weight.

(C) Preparation of a treating agent 189 g. of the prepolymer obtained in part (B) above was charged into a glass flask equipped with agitator and heated with agitation to 50° C. 50 g. of the hydroxyl containing nitrogen compound obtained in part (A) above was charged into a second glass flask equipped with an agitator and heated to 50° C. The heated prepolymer was slowly added over thirty minutes to the heated nitrogen compound in the second glass flask while the reaction temperature was maintained at 50° C., and agitation was continued to obtain uniform mixing and reaction. After addition was complete, the mixture was heated to 90° C. and then heated at 90° to 95° C. for ninety minutes to complete reaction thereby forming the treating agent. Thereafter the treating agent was cooled to 30° C. and 18 g. of glacial acetic acid (99% active) was added. The resulting mixture was then diluted with de-ionized water to obtain a 50% active composition of the treating agent.

EXAMPLE XVI

(A) Preparation of a hydroxyl containing nitrogen compound

A mixture of 144.5 g. of diethanolamine and 60.8 g. of water was charged into a glass flask equipped with agitator, reflux condenser and having provisions for external heating and cooling. The mixture was cooled to 10° C. and 111.8 g. of formaldehyde (37% active and adjusted to a pH of 8.0 to 8.2 with 30° Bé. sodium hydroxide) and 60.8 g. of water were added slowly over one hour while agitating the reaction mixture and maintaining the temperature between 8° and 10° C. 301.9 g. of nonylphenol was added over five minutes with vigorous agitation and the temperature of the reaction mixture allowed to rise to 25° C. over one hour. 320.2 g. of methanol was then added with agitation. The reaction mixture was heated to 60° C. and held at 60° to 65° C. for two hours. The resulting product which was the hydroxyl containing nitrogen compound was then heated under vacuum to remove water and methanol and other volatiles by distillation. Vacuum distillation was continued until a pot temperature of 110° C. was reached and the water content of the hydroxyl containing nitrogen compound in the flask was 0.15% by weight.

(B) Preparation of a prepolymer 257 g. of tolylene diisocyanate was charged into a glass flask equipped with agitator, external heating and cooling facilities as well as provisions for maintaining a nitrogen blanket over the reactants to maintain anhydrous conditions during reaction. 743 g. of a polypropylene glycol having a molecular weight of 1025 was added to the diisocyanate under nitrogen over thirty minutes while agitating and maintaining the reaction temperature between 45° and 55° C. After addition was complete, the mixture was heated to 75° C. It was held at 75° to 80° C. until the isocyanate content of the prepolymer was between 6.0% and 6.4% by weight.

(C) Preparation of the treating agent 685 g. of the prepolymer obtained in part (B) above and 373 g. of the hydroxyl containing nitrogen compound obtained in part (A) above were charged to a glass flask equipped with agitator, and reflux condenser. The mixture was gradually heated to 90° C. and held at 90° to 100° C. for ninety minutes to complete reaction.

After reaction was complete, the mixture was cooled to 65° C. and 163 g. of formaldehyde (37% active and containing 1 g. of sodium hydroxide) was added at 65° C. with agitation. This mixture was heated for two hours at 65° C. to prepare the treating agent. 34.2 g. of a nonionic emulsifier containing one mole of nonylphenol condensed with nine to ten moles of ethylene oxide and 111.2 g. of 2-methoxyethanol were added to the agent. The mixture was cooled to 30° C. and 60 g. of glacial acetic acid (99% active) was then added to obtain a treating agent composition.

EXAMPLE XVII

(A) Preparation of a hydroxyl containing nitrogen compound

A mixture of 315 g. of diethanolamine and 60 g. of methanol was charged into a glass flask equipped with agitator, reflux condenser and having provisions for external heating and cooling. The mixture was cooled to 10° C. and 244.5 g. of formaldehyde (37% active) was added slowly over one hour while agitating the reaction mixture and maintaining the temperature between 10° C. and 15° C. After addition was complete, a mixture of 282 g. of phenol and 25 g. of methanol was added over fifteen minutes. The reaction mixture was agitated at 18° to 22° for one hour, heated to 65° C. and agitated for two hours at 65° C. to complete reaction. The resulting product, which was the hydroxyl containing nitrogen compound, was then vacuum distilled to remove water, methanol and other volatiles. Vacuum distillation was continued until a pot temperature of 110° C. was reacted and the product was held under vacuum at this temperature for one hour. The water content of the hydroxyl containing nitrogen compound in the flask was less than 0.2% by weight.

(B) Preparation of a prepolymer 174 g. of tolylene diisocyanate was charged into a glass flask equipped with agitator, external heating and cooling facilities as well as provisions for maintaining a nitrogen blanket over the reactants to provide anhydrous conditions during reaction. A mixture of 90 g. of a polyethylene glycol having a molecular weight of 600 and 357.4 g. of a polypropylene glycol having a molecular weight of 1025 (a 3:7 molar ratio of polyethylene glycol to polypropylene glycol) was added to the tolylene diisocyanate under nitrogen over fifteen minutes while agitating and maintaining the reaction temperature between 45° and 55° C. After addition was complete, the mixture was heated to 75° C. It was heated at 75° to 80° for one hour to complete reaction. The prepolymer had an isocyanate content of 6.75% by weight.

(C) Preparation of the treating agent 124 g. of the prepolymer obtained in part (B) above was charged into a glass flask and heated to 65° C. 42.2 g. of the hydroxyl containing nitrogen compound obtained in part (A) above was charged to a second flask and heated to 65° C. The heated hydroxyl containing nitrogen compound was slowly added to the heated prepolymer over thirty minutes at 65° C. The mixture was then heated to 95° C. and held for ninety minutes at 95° to 100° C. to complete reaction.

After reaction was complete, the mixture was cooled to 75° C. and 65.2 g. of formaldehyde (37% active) was added at 60° to 65° C. over thirty minutes with agitation. This mixture was heated for three hours at 72° to 75° C. with agitation to obtain the treating agent. The agent was cooled to 25° C. and 12 g. glacial acetic acid (99% active) and 161.4 g. of water were added to obtain a 50% active composition of the treating agent. When this composition was diluted with water to 20% active, a

EXAMPLE XVIII (A) Preparation of a hydroxyl containing nitrogen compound

A mixture of 315 g. of diethanolamine and 60 g. of methanol was charged into a glass flask equipped with agitator, reflux condenser and having provisions for external heating and cooling. This mixture was cooled to 10° C. and 244.5 g. of formaldehyde (37% active) was slowly added with agitation over sixty minutes while the reaction temperature was maintained between 10° and 15° C. After addition was complete, a mixture of 282 g. of phenol and 25 g. of methanol was added over fifteen minutes at 18° to 22° C. with vigorous agitation. The reaction mixture was agitated at 18° C. to 22° C. for one hour, heated to 65° C. and agitated for two hours at 65° C. to complete reaction. The resulting product which was the hydroxyl containing nitrogen compound was then vacuum distilled to remove water, methanol and other volatiles. Vacuum distillation was continued until a pot temperature of 100° C. was reached and the product was held under vacuum at 100° C. for fifteen minutes. The hydroxyl containing compound was then cooled to 30° C. Analysis showed the water content of the hydroxyl containing compound was 0.5% by weight.

(B) Preparation of a prepolymer 188 g. of tolylene diisocyanate was charged into a glass flask equipped with agitator, external heating and cooling facilities as well as provisions for maintaining a nitrogen blanket over the reactants to provide anhydrous conditions during reaction. 812 g. of a polyethylene glycol having a molecular weight of 1540 was added with agitation to the tolylene diisocyanate under nitrogen over thirty minutes while maintaining the reaction temperature at 45° to 55° C. After addition was complete, the reaction mixture was heated to 80° C. and held at 80° to 85° C. for one hour. Analysis showed the isocyanate content of the prepolymer was between 4.28 and 4.88% by weight.

(C) Preparation of a treating agent 500 g. of the prepolymer obtained in part (B) above was charged into a glass flask and heated to its melting point. After the prepolymer was melted, 105.5 g. of the hydroxyl containing nitrogen compound obtained in part (A) above was mixed with the molten prepolymer and heated to a temperature of 90° C. This mixture was held at 90° to 95° C. for ninety minutes to complete reaction. This treating agent was employed in compositions (1) and (2) below.

(1) The treating agent was cooled to 70° C. and a solution containing 30 g. of glacial acetic acid (99% active) in 635.5 g. of water was added to prepare a 50% active treating agent composition. This composition was water-soluble and could be diluted with large quantities of water.

(2) A treating agent composition containing 50 g. of the treating agent, 50 g. of water and 100 g. of a 40% solution by weight of the disodium salt of disulfo dinaphthyl methane was prepared. This composition was also water-soluble and could be diluted with large quantities of water.

EXAMPLE XIX (A) Preparation of a hydroxyl containing nitrogen compound

A mixture of 315 g. of diethanolamine and 60 g. of methanol was charged into a glass flask equipped with agitator, reflux condenser and having provisions for external heating and cooling. The mixture was cooled to 10° C. and 244.5 g. of formaldehyde (37% active) was added slowly over one hour with agitation at 10° to 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the hydroxyl containing nitrogen compound was vacuum distilled to remove water, methanol and other volatiles. Vacuum distillation was continued until a pot temperature of 110° C. was reached and the product was held under vacuum at 110° C. for one hour. The water content of the nitrogen compound in the flask was less than 0.2% by weight.

(B) Preparation of a prepolymer 258 g. of tolylene diisocyanate was charged into a flask equipped with agitator, external heating and cooling facilities as well as provisions for maintaining a nitrogen blanket over the reactants to provide anhydrous conditions during reaction. 742 g. of a polyethylene glycol having a molecular weight of 1000 was added to the tolylene diisocyanate under nitrogen over a period of thirty minutes with agitation at 45° to 55° C. After addition was complete, the reactants were heated to 70° C. and held at 70° to 75° C. until the isocyanate content of the prepolymer was between 6.0 and 6.5% by weight.

(C) Preparation of a treating agent 316.5 g. of the prepolymer obtained in part (B) above was charged into a glass flask and heated to 65° C. 105.5 g. of the hydroxyl containing nitrogen compound obtained in part (A) above was slowly added to the prepolymer over thirty minutes at 65° C. The mixture was heated to 90° C. and held at 90° to 95° C. for ninety minutes to complete reaction.

After reaction was complete, the mixture was cooled to 60° C. and 163 g. of formaldehyde (37% active by weight and containing 0.5 g. of sodium hydroxide) was added at 60° to 65° C. with agitation. This mixture was heated for two hours at 60° to 65° C. to obtain the treating agent. A treating agent composition containing 50 g. of the treating agent, 50 g. of water and 100 g. of 40% solution of a sodium salt of disulfo dinaphthylmethane was prepared by mixing the ingredients at 30° C.

EXAMPLE XX (A) Preparation of a hydroxyl containing nitrogen compound

A mixture of 315 g. of diethanolamine and 60 g. of methanol was charged into a glass flask equipped with agitator, reflux condenser and having provisions for external heating and cooling. The mixture was cooled to 10° C. and 244.5 g. of formaldehyde (37% active) was added slowly over sixty minutes while agitating the reaction mixture and maintaining the temperature between 10° and 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the hydroxyl containing nitrogen compound was then vacuum distilled to remove water, methanol and other volatiles. Vacuum distillation was continued until a pot temperature of 110° C. was reached and the product was heated under vacuum at 110° C. for one hour. The water content of the nitrogen compound in the flask was found to be less than 0.2% by weight.

(B) Preparation of a prepolymer 257 g. of tolylene diisocyanate was charged into a glass flask equipped with agitator, external heating and cooling facilities as well as provisions for maintaining a nitrogen blanket over the reactants to provide anhydrous conditions during reaction. 743 g. of a polypropylene glycol having a molecular weight of 1025 was added to the tolylene diisocyanate under nitrogen over thirty minutes while agitating and maintaining the reaction temperature between 45° and 55° C. After addition was complete, the mixture was heated to 60° C. and then gradually heated to a temperature of 75° C. It was held at 75° to 80° C. until the isocyanate content of the prepolymer was between 6.0% and 6.4% by weight.

(C) Preparation of the treating agent 685 g. of the prepolymer obtained in part (B) above was charged into a glass flask and heated to 65° C. 211 g. of the hydroxyl containing nitrogen compound obtained in part (A) above was added slowly to the prepolymer over thirty minutes at 65° C. The mixture was heated to 90° C. and held at 90° C. to 95° C. for ninety minutes to complete reaction.

After reaction was complete, the mixture was cooled to 60° C. and 163 g. of formaldehyde (37% active by weight and containing 0.5 g. of sodium hydroxide) was added at 60° to 65° C. with agitation. This mixture was heated for four hours at 60° to 65° C. to obtain the treating agent. 30.5 g. of a nonionic emulsifier containing one mole of nonylphenol condensed with nine to ten moles of ethylene oxide and 100 g. of 2-methoxyethanol were added to the treating agent. This mixture was cooled to 30° C. and 60 g. of glacial acetic acid (99% active) added to produce a treating agent composition. This treating agent composition was found to disperse readily in water. It was used to prepare aqueous dispersions of dyestuffs and pigments which were applied to glass fibers and other textile fibers.

EXAMPLE XXI

Composition of a treating agent 124.6 g. of the treating agent composition obtained in Example XX(C) was charged into a glass flask and 23.3 g. of a 4,5-epoxy eicosane, di-(isodecyl) 4,5-epoxy was added with agitation at 25° C. over fifteen minutes. The mixture was then agitated at 25° C. for one hour to obtain a treating agent composition.

EXAMPLE XXII

Composition of a treating agent 125 g. of the treating agent composition obtained in Example XX(C) was charged into a glass flask and 18.4 g. of 1,2-epoxydodecane was added with agitation at 25° C. over fifteen minutes. The mixture was then agitated at 25° C. for one hour to obtain a treating agent composition.

EXAMPLE XXIII

Composition of a treating agent 818.7 g. of the treating agent obtained in Example XX(C) was charged into a glass flask and 181.3 g. of epoxidized soya bean oil having an oxygen content of 7.0% by weight was added with agitation at 25° C. over fifteen minutes. The mixture was then agitated at 25° C. for one hour to obtain a treating agent composition.

EXAMPLE XXIV (A) Preparation of a hydroxyl containing nitrogen compound

A mixture of 315 g. of diethanolamine and 60 g. of methanol was charged into a glass flask equipped with agitator, reflux condenser and having provisions for external heating and cooling. The charge was cooled to 10° C. and 244.5 g. of formaldehyde (37% active) was added slowly over one hour while the reaction mixture was agitated and held at 10° to 15° C. After addition was complete, a mixture of 282 g. of phenol and 25 g. of methanol was added with vigorous agitation over fifteen minutes while the reaction temperature was maintained at 18° to 22° C. The reaction mixture was agitated for one hour at 18° to 22° C., heated to 65° C. and agitated for two hours at 65° C. to complete reaction. The resulting product which was the hydroxyl containing nitrogen compound was vacuum distilled to remove water, methanol and other volatiles. Vacuum distillation was continued until a pot temperature of 100° C. was reached. The product was then heated under vacuum at 100° C. for fifteen minutes and then cooled to 30° C. Analysis showed the hydroxyl containing nitrogen compound had a water content of 0.5% by weight.

A total of 422 g. of the hydroxyl containing compound was charged into a glass flask equipped with agitator, reflux condenser and provisions for external heating and cooling. 13.8 g. of 55% formaldehyde in methanol was charged into the flask containing the nitrogen compound. This mixture was heated to 75° C. and held at 75° C. for one hour to complete reaction. The resulting product which was the condensate of the hydroxyl containing nitrogen compound obtained by condensation of 0.125 mole of formaldehyde with each mole of nitrogen compound was then vacuum distilled to remove water, methanol and other volatiles. Vacuum distillation was carried out by heating the condensate from 70° to 100° C. at reduced pressure over thirty minutes. When a pot temperature of 100° C. was reached, the condensate was cooled to room temperature.

(B) Preparation of a prepolymer 743 g. of polypropylene glycol having a molecular weight of 1025 and 257 g. of tolylene diisocyanate were charged into a glass flask equipped with agitator, external heating and cooling facilities as well as provisions for maintaining a nitrogen blanket over the reactants to provide anhydrous conditions during reaction. The reactants were charged under a nitrogen blanket in the flask. This mixture was heated with agitation to a temperature of 60° C. The mixture was then slowly heated with agitation to 75° C. and maintained at 75° to 80° C. for one hour. The product which was the prepolymer had an isocyanate content of 6.0 to 6.4% by weight.

(C) Preparation of a treating agent 162.9 g. of the hydroxyl containing nitrogen compound obtained in part (A) above and 540.3 g. of the prepolymer obtained in part (B) above were charged into a glass flask equipped with agitator, reflux condenser and provisions for external heating and cooling. The mixture was slowly heated with agitation to 95° C. and agitated at 95° to 98° C. for ninety minutes to complete reaction. The reaction mixture was cooled to 70° C. and 125.8 g. of formaldehyde (37% active and containing 0.8 g. of 50° Bé. sodium hydroxide) was added and agitated until a uniform mixture was obtained. 21.1 g. of a 55% solution of formaldehyde in methanol was added as soon as the mixture became uniform. This mixture was heated with agitation for two hours at 60° C. to 65° C. to complete reaction. The product which is a treating agent was mixed with 23.7 g. of a nonionic emulsifier containing one mole of nonylphenol condensed with nine to ten moles of ethylene oxide, 79.1 g. of 2-methoxyethanol and 46.3 g. of glacial acetic acid (99% active) to obtain the treating agent composition. This composition produced dispersions having small particle size when diluted with water. This example demonstrates reaction of all available reactive hydrogens in the treating agent with formaldehyde.

(D) Preparation of a treating agent composition 818.7 g. of the treating agent composition obtained in part (C) above and 181.3 g. of epoxidized soya bean oil having an oxygen content of 7.0% by weight were charged into a glass flask equipped with agitator and were agitated for one hour to produce treating agent composition.

EXAMPLE XXV

(A) Preparation of the prepolymer 51.6 g. of tolylene diisocyanate was charged into a flask equipped with agitator, external heating and cooling facilities as well as provisions for maintaining a nitrogen blanket over the reactants during reaction. 148.4 g. of a polyethylene glycol having a molecular weight of 1000 was added with agitation to the diisocyanate under nitrogen over thirty minutes while the reaction temperature was maintained at 45° to 55° C. After addition was complete, the reactants were heated to 70° C. and held at 75° to 80° C. until the isocyanate content of the prepolymer was between 6.0 and 6.5% by weight.

(B) Preparation of the treating agent 140 g. of the prepolymer obtained in part (A) above and 19.5 g. of N-benzyl diethanolamine were charged into a glass flask equipped with agitator and were heated with agitation to 90° C. The reaction mixture was heated at 90° to 95° C. for ninety minutes to complete reaction. The reaction product was then cooled to 80° C. and a solution of 6.0 g. of glacial acetic acid (99% active) in 165.5 g. of water was added with agitation to prepare a treating agent composition.

(C) Use of N-benzyl diethanolamine treating agent as a pigment binder

A composition of the treating agent obtained in part (B) above was prepared by mixing 30 g. of the treating agent in 200 g. of water at 25° C. and 6 g. of the pigment, C.I. RB 31 iron oxide red. This composition was used at room temperature as a padding bath. Fiber glass fabric was padded with the composition by passing the fabric through a threading of one dip and one nip on the Butterworth padding machine with 20 lbs. roll pressure. A wet pickup of 25% based on the weight of fabric was obtained. The fabric was air dried at room temperature on a pin frame and then heated in an oven at 325° F. for three minutes to cure.

The washfastness of the cured fabric sample was evaluated by placing a 4 g. sample of the treated fabric in a one pint Launder-Ometer jar which contained 150 cc. of a 0.2% by weight solution of a synthetic detergent (Tide—Procter & Gamble Co.) in water and ten rubber balls. This jar was placed in the Launder-Ometer at 130° F. and agitated for ten minutes. After ten minutes, the sample was removed and given a five minute warm water rinse. Examination of the sample of treated fabric showed that it had poor washfastness. This test demonstrated that the treating agent derived from N-benzyl diethanolamine was unsatisfactory as a pigment binder.

EXAMPLE XXVI

(A) Preparation of a hydroxyl containing nitrogen compound 26.9 g. of N-methyl monoethanolamine and 7.17 g. of methanol were charged into a glass flask equipped with agitator, reflux condenser and having provisions for external heating and cooling. This mixture was cooled to 10° C. and a solution of 29.22 g. of formaldehyde (37% active) was added to the N-methyl ethanolamine solution over ninety minutes at 80 to 10° C. A solution of 33.71 g. of phenol in 3 g. of methanol was added to the charge over five minutes with vigorous agitation. The reaction temperature was allowed to rise to 25° C. The reaction mixture was held at 20° to 25° C. for one hour and was then heated to 65° C. over a period of two hours. The resulting product which was the hydroxyl containing nitrogen compound was then heated under vacuum to remove water and methanol by distillation. Vacuum distillation was continued until a pot temperature of 100° C. was reached. The vacuum distillation was continued for fifteen minutes at 100° C. and the hydroxyl containing nitrogen compound was then cooled to room temperature.

(B) Preparation of a prepolymer 257 g. of tolylene diisocyanate and 743 g. of polypropylene glycol having a molecular weight of 1025 were charged into a glass flask equipped with agitator, external heating and cooling facilities as well as provisions for maintaining a nitrogen blanket over the reactants during reaction. The reactants were then heated to 75° C. under nitrogen and held at 75° to 80° C. until the isocyanate content of the prepolymer was 6.3% by weight.

(C) Preparation of a treating agent 33.3 g. of the prepolymer obtained in part (B) above and 90.5 g. of the hydroxyl containing nitrogen compound obtained in part (A) above were charged into a glass flask equipped with an agitator and reflux condenser as well as provisions for external heating and cooling. The reaction mixture was heated to 95° C. and held at 95° C. for ninety minutes to complete reaction. The reaction product was cooled to 70° C. 101.8 g. of formaldehyde (37% active and containing 0.5 g. of 50° Bé. sodium hydroxide) was added. The mixture was agitated for two hours at 60° to 65° C. to methylolate the reaction product. The resulting methylolated product which was the treating agent was then mixed with 14.7 g. of a nonionic emulsifier containing one mole of nonylphenol condensed with from nine to ten moles of ethylene oxide, 49.5 g. of 2-methoxyethanol and 30 g. of glacial acetic acid (99% active) to produce a composition of the treating agent.

EXAMPLE XXVII

(A) Preparation of a hydroxyl containing nitrogen compound 362 g. of the hydroxyl containing nitrogen compound obtained in Example XXVI(A) and 27.5 g. of 55% formaldehyde in methanol solution were charged into a glass flask equipped with agitator, reflux condenser and having provisions for external heating and cooling. This mixture was heated to 75° C. with agitation and reacted at 75° C. for ninety minutes. The resulting product which is the condensate of a hydroxyl containing nitrogen compound and formaldehyde was then heated under vacuum to remove water and methanol by distillation. Vacuum distillation was continued until a pot temperaure of 100° C. was reached. Vacuum distillation was then continued for fifteen minutes at 100° C. and the resulting hydroxyl containing nitrogen compound was cooled to room temperature. Analysis showed that the hydroxyl containing compound had a water content of 0.5% by weight.

(B) Preparation of a prepolymer 257 g. of tolylene diisocyanate and 743 g. of polypropylene glycol having a molecular weight of 1025 were charged into a glass flask equipped with agitator, external heating and cooling facilities as well as provisions for maintaining a nitrogen blanket over the reactants during reaction. The reactants were heated to 75° C. under nitrogen and held at 75° to 80° C. until the isocyanate content of the prepolymer was 5.9% by weight.

(C) Preparation of a treating agent 90.5 g. of the hydroxyl containing nitrogen compound obtained in part (A) above and 352 g. of the prepolymer obtained in part (B) above were charged into a glass flask equipped with an agitator and reflux condenser as well as provisions for external heating and cooling. The reactants were heated to 95° C. and held at 95° C. for ninety minutes to complete reaction. The reaction mixture was then cooled to 70° C. and 81.5 g. of formaldehyde (37% active) was added. 27.5 g. of 55% formaldehyde in methanol solution was then added. The reaction mixture was then agitated for two hours at 60° to 65° C. to produce a methylolated treating agent. The resulting methylolated treating agent was then mixed with 15.5 g. of a nonionic emulsifier containing one mole of nonylphenol condensed with from nine to ten moles of ethylene oxide, 51.8 g. of 2-methoxyethanol and 30 g. of glacial acetic acid (99% active) to produce a composition of the treating agent.

EXAMPLE XXVIII (A) Preparation of a hydroxyl containing nitrogen compound

A solution of 315 g. of diethanolamine and 60 g. of methanol was charged into a glass flask equipped with agitator, reflux condenser and having provisions for external heating and cooling. The solution was cooled to 10° C. and 244.5 g. of formaldehyde (37% active) was added slowly over sixty minutes while agitating the reaction mixture and maintaining the temperature at 10° to 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the hydroxyl containing nitrogen compound was then vacuum distilled to remove water, methanol and other volatiles. Vacuum distillation was continued until a pot temperature of 100° C. was reached and the product was held under vacuum at 100° C. for fifteen minutes. The hydroxyl containing compound was then cooled to 30° C. The water content of the nitrogen compound in the flask was less than 0.5% by weight.

(B) Preparation of a prepolymer 1144 g. of a polypropylene glycol terminated with ethylene oxide to obtain a product with primary hydroxyl groups having an average molecular weight of 1144 and a hydroxyl value of 98 and 348 g. of tolylene diisocyanate were charged into a glass flask equipped with agitator, external heating and cooling facilities as well as provisions for maintaining a nitrogen blanket over the reactants during reaction to provide anhydrous conditions. The reactants were agitated under a nitrogen blanket and heated to a temperature of 65° C. The temperature was then gradually increased to 75° C. and the reatcion mixture heated at 75° to 80° C. for one hour to obtain a prepolymer having an isocyanate content of 5.5% by weight.

(C) Preparation of the treating agent 274.3 g. of the hydroxyl containing nitrogen compound obtained in part (A) above was charged into a glass flask and 992.6 g. of the prepolymer obtained in part (B) above was added. The mixture was agitated for ninety minutes to complete reaction.

After reaction was complete, the reaction product was cooled to 65° C. and 211.9 g. of formaldehyde (37% active and containing 1.3 g. of sodium hydroxide 50° Bé. solution) was added slowly with agitation. This reaction mixture was agitated for four hours at 60° to 65° C. to obtain the treating agent. 42 g. of a nonionic emulsifier containing one mole of nonylphenol condensed with nine to ten moles of ethylene oxide and 139 g. of 2-methoxyethanol were added with agitation. This mixture was cooled to 30° C. and 78 g. of glacial acetic acid (99% active) was added to produce a treating agent composition.

EXAMPLE XXIX (A) Preparation of a hydroxyl containing nitrogen compound

A solution of 144.5 g. of diethanolamine and .60.8 g. of water was charged into a glass flask equipped with agitator, reflux condenser and having provisions for external heating and cooling. The solution was cooled to 10° C. and 111.8 g. of formaldehyde (37% active and adjusted to a pH of 8.0 to 8.2 with 30° Bé. sodium hydroxide) in 60.8 g. of water was added slowly over one hour while agitating the reaction mixture and maintaining the temperature between 8° and 10° C. 301.9 g. of nonylphenol was added to the solution over five minutes with vigorous agitation. The temperature of the reaction mixture was allowed to rise to 25° C. over one hour. 320.2 g. of methanol was then added with agitation and the reaction mixture was heated to 60° C. The reaction mixture was heated to 60° to 65° C. for two hours to complete reaction. The resulting product which was the hydroxyl containing nitrogen compound was then heated under vacuum to remove water, methanol and other volatiles by distillation. Vacuum distillation was continued until a pot temperature of 100° C. was reached and the water content of the hydroxyl containing nitrogen compound in the flask was 0.15% by weight.

(B) Preparation of the prepolymer 188 g. of tolylene diisocyanate was charged into a glass flask equipped with aigtator, external heating and cooling facilities as well as provisions for maintaining a nitrogen blanket over the reactants during reaction to provide anhydrous conditions. 812 g. of a polyethylene glycol having a molecular weight of 1540 was added with agitation to the tolylene diisocyanate under nitrogen over thirty minutes while the reaction temperature was maintained at 45° to 55° C. After addition was complete, the reaction mixture was heated to 80° C. and held at 80° to 85° C. for one hour. Analysis showed the isocyanate content of the prepolymer was between 4.28 and 4.88% by weight.

(C) Preparation of a treating agent 168.5 g. of hydroxyl containing nitrogen compound obtained in part (A) above and 481.5 g. of prepolymer obtained in part (B) above were charged into a glass flask and heated with agitation to 90° C. The reaction mixture was heated at 90° to 95° C. for ninety minutes to complete reaction. This treating agent was employed in compositions (1) and (2) below, (1) The treating agent was cooled to 70° C. and 30 g. of glacial acetic acid (99% active) and 680 g. of water were added to obtain a treating agent composition.

(2) A treating agent composition containing 325 g. of the treating agent, 500 g. of a 40% solution by weight of the disodium salt of disulfo dinaphthyl methane and 325 g. of water was prepared.

EXAMPLE XXX (A) Preparation of a hydroxyl containing nitrogen compound

A solution of 315 g. of diethanolamine in 60 g. of methanol was charged into a glass flask equipped with agitator, reflux condenser and having provisions for external heating and cooling. The solution was cooled to 10° C. and 244.5 g. of formaldehyde (37% active) was added slowly over one hour while the reaction mixture was agitated and maintained at a temperature of 10° to 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the hydroxyl containing nitrogen compound was vacuum distilled to remove water, methanol and other volatiles. Vacuum distillation was continued until a pot temperature of 100° C. was reached and the product was heated for fifteen minutes under vacuum at 100° C. The hydroxyl containing compound was then cooled to 30° C. Analysis showed that it had a water content of 0.5% by weight.

A total of 422 g. of the hydroxyl containing compound was charged into a glass flask equipped with agitator, reflux condenser and provisions for external heating and cooling. 13.8 g. of 55% formaldehyde in methanol was charged into the flask containing the nitrogen compound. This mixture was heated to 75° C. and held at 75° C. for one hour to complete reaction. The resulting product which was the condensate of the hydroxyl containing nitrogen compound obtained by condensation of 0.125 mole of formaldehyde with each mole of nitrogen compound was then vacuum distilled to remove water, methanol and other volatiles. Vacuum distillation was carried out by heating the condensate from 70° to 100° C. at reduced pressure over thirty minutes. When a pot temperature of 100° C. was reached, the condensate was cooled to room temperature.

(B) Preparation of a prepolymer 257 g. of tolylene diisocyanate was charged into a glass flask equipped with agitator, external heating and cooling facilities, as well as provisions for maintaining a nitrogen blanket over the reactants during reaction to provide anhydrous conditions. 743 g. of a polypropylene glycol having a molecular weight of 1025 was added to the tolylene diisocyanate under nitrogen over thirty minutes while agitating and maintaining the reaction mixture at 45° to 55° C. After addition was complete, the reaction mixture was heated to 60° C. and then gradually heated to 75° C. It was heated at 75° to 80° C. until the isocyanate content of the prepolymer was between 6.0 and 6.4% by weight.

(C) Preparation of the treating agent 105.5 g. of the hydroxyl containing compound obtained in part (A) above and 350 g. of the prepolymer obtain in part (B) above were charged into a glass flask equipped with agitator and heated with agitation to 95° C. The reaction mixture was heated with agitation for ninety minutes at 95° to 100° C. The mixture was cooled to 80° C. and 350 g. of isopropanol (99% active) was added. The mixture was stirred until a uniform solution was obtained. 350 g. of the prepolymer obtained in part (B) above was added to the mixture. This mixture was then heated under reflux at 85° C. for three hours. The resulting reaction product was then cooled to 70° C. 122 g. of formaldehyde (37% active) and 82.5 g. of 55% active formaldehyde in methanol were added. This mixture was reacted at 60° to 65° C. for three hours to obtain the treating agent.

EXAMPLE XXXI (A) Preparation of a hydroxyl containing nitrogen compound

A mixture of 315 g. of diethanolamine and 60 g. of methanol was charged into a glass flask equipped with agitator, reflux condenser and having provisions for external heating and cooling. The mixture was cooled to 10° C. and 244.5 g. of formaldehyde (37% active) was added slowly over sixty minutes while agitating the reaction mixture and maintaining the temperature between 10° and 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the hydroxyl containing nitrogen compound was then vacuum distilled to remove water, methanol and other volatiles. Vacuum distillation was continued until a pot temperature of 110° C. was reached and the product was held under vacuum at 110° C. for one hour. The water content of the nitrogen compound in the flask was less than 0.2% by weight.

(B) Preparation of a prepolymer 257 g. of tolylene diisocyanate was charged into a glass flask equipped with agitator, external heating and cooling facilities, as well as provisions for maintaining a nitrogen blanket over the reactants to provide anhydrous conditions during reaction and 743 g. of a polypropylene glycol having a molecular weight of 1025 was added to the tolylene diisocyanate under nitrogen over thirty minutes while agitating and maintaining the reaction temperature between 45° and 55° C. After addition was complete, the mixture was heated to 60° C. and then gradually heated to a temperature of 75° C. It was held at 75° to 80° C. until the isocyanate content of the prepolymer was between 6.0% and 6.4% by weight.

(C) Preparation of the treating agent at room temperature 211 g. (1 mole) of the hydroxyl containing nitrogen compound obtained in part (A) above was charged into a glass flask. 200 g. (0.5 mole) of a diepoxide in the form of the diglycidyl derivative of 4,4'-dihydroxy-diphenyl-dimethyl methane (Shell diepoxide 828) was charged into the flask. 2073 g. (1.5 mole) of the prepolymer obtained in part (B) above was then charged into the flask and the mixture agitated to obtain a uniform composition. This composition was found to be an excellent adhesive. It produced tack free films twenty-five hours after application.

EXAMPLE XXXII (A) Preparation of a hydroxyl containing nitrogen compound

A mixture of 315 g. of diethanolamine and 60 g. of methanol was charged into a glass flask equipped with agitator, reflux condenser and having provisions for external heating and cooling. The mixture was cooled to 10° C. and 245 g. of formaldehyde (37% active) was slowly added over one hour while the mixture was agitated and maintained at a temperature of 10° to 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the hydroxyl containing nitrogen compound was vacuum distilled to remove water and other volatiles. Vacuum distillation was continued until a pot temperature of 100° C. was reached. The product was heated under vacuum at 100° C. for fifteen minutes and then cooled to 30° C. Analysis showed the hydroxyl containing nitrogen compound had a water content of 0.5% by weight.

A total of 422 g. of the hydroxyl containing compound was charged into a glass flask equipped with agitator, reflux condenser and having provisions for external heating and cooling. 13.8 g. of 55% formaldehyde in methanol was charged into the flask containing the nitrogen compound. This mixture was heated to 75° C. and held at 75° C. for one hour to complete reaction. The resulting product which was the condensate of the hydroxyl containing nitrogen compound obtained by condensation of 0.125 moles of formaldehyde with each mole of nitrogen compound was then vacuum distilled to remove water, methanol and other volatiles. Vacuum distillation was carried out by heating the condensate from 70° to 100° C. at reduced pressure over thirty minutes. When a pot temperature of 100° C. was reached, the condensate was cooled to room temperature.

(B) Preparation of a prepolymer 257 g. of tolylene diisocyanate and 743 g. of a polypropylene glycol having a molecular weight of 1025 were changed into a glass flask equipped with agitator, reflux condenser, external heating and cooling facilities as well as provisions for maintaining a nitrogen blanket over the reactants during reaction to provide anhydrous conditions. The mixture was heated under nitrogen to 75° C. and held at 75° to 80° C. until the isocyanate content of the prepolymer was between 6.0 and 6.4% by weight.

(C) Preparation of the treating agent 667 g. (0.5 mole) of the prepolymer obtained in part (B) above and 106 g. (0.5 mole) of the hydroxyl containing nitrogen compound obtained in part (A) above were charged into a glass flask and thoroughly mixed at room temperature. The resulting treating agent composition was found to have excellent adhesive properties for bonding metal-to-metal and wood-to-wood. It was also found useful as a sealant for these materials particularly when the prepolymer and hydroxyl containing nitrogen compound was used as a two component system. Fiber tearing bonds were obtained when this treating agent was used in bonding wood-to-wood.

EXAMPLE XXXIII

(A) Preparation of a hydroxyl containing nitrogen compound

A solution of 315 g. of diethanolamine and 60 g. of methanol was charged into a glass flask equipped with agitator, reflux condenser and having provisions for external heating and cooling. The solution was cooled to 10° C. and 244.5 g. of formaldehyde (37% active) was added over one hour while the reaction mixture was agitated and maintained at a temperature of 10° to 15° C. After addition was complete, a mixture of 282 g. of phenol and 25 g. of methanol was added over fifteen minutes at 18° to 22° C. with vigorous agitation. The reaction mixture was agitated at 18° to 22° C. for one hour, heated to 65° C. and agitated for two hours at 65° C. to complete reaction. The resulting product which was the nitrogen compound was vacuum distilled to remove water and other volatiles. Vacuum distillation was continued until a pot temperature of 100° C. was reached and the product was held under vacuum for fifteen minutes. The hydroxyl containing compound was then cooled to 30° C. Analysis showed that the hydroxyl containing nitrogen compound had a water content of 0.5% by weight.

A total of 422 g. of the hydroxyl containing compound was charged into a glass flask equipped with agitator, reflux condenser and having provisions for external heating and cooling. 13.8 g. of 55% formaldehyde in methanol was charged into the flask containing the nitrogen compound. This mixture was heated to 75° C. and held at 75° C. for one hour to complete reaction. The resulting product which was the condensate of the hydroxyl containing nitrogen compound obtained by condensation of 0.125 moles of formaldehyde with each mole of nitrogen compound was then vacuum distilled to remove water, methanol and other volatiles. Vacuum distillation was carried out by heating the condensate from 70° to 100° C. at reduced pressure over thirty minutes. When a pot temperature of 100° C. was reached, the condensate was cooled to room temperature.

(B) Preparation of a prepolymer 257 g. of tolylene diisocyanate was charged into a glass flask equipped with agitator, external heating and cooling facilities as well as provisions for maintaining a nitrogen blanket over the reactants during reaction to provide anhydrous conditions. 743 g. of a polypropylene glycol having a molecular weight of 1025 was added to the tolylene disisocyanate under nitrogen over thirty minutes while agitating and maintaining the reaction temperature at 45° to 55° C. After addition was complete, the mixture was gradually heated to 75° C. and was reacted at 75° to 80° C. until the isocyanate content of the prepolymer was between 6.0 and 6.4% by weight.

(C) Preparation of the treating agent 333 g. (0.25 mole) of the prepolymer obtained in part (B) above and 105.5 g. (0.50 mole) of the hydroxyl containing nitrogen compound obtained in part (A) above were charged into a glass flask and heated to 95° C. The reaction mixture was heated at 95° to 100° C. for two hours to obtain a treating agent.

44 g. (0.025 mole) of the treating agent was mixed at room temperature with 20 g. (0.05 mole) of a diepoxide in the form of the diglycidyl derivative of 4,4'-dihydroxy-diphenyl-dimethyl methane and 10.6 g. (0.05 mole) of the hydroxyl containing nitrogen compound obtained in part (A) above. This treating agent composition was found to be an excellent adhesive for bonding wood-to-wood and metal-to-metal. It produced fiber tearing bonds when used as a wood-to-wood adhesive. Highly adhesive films were produced when the composition was dissolved in organic solvents such as xylol. When these films were cured for fifteen minutes at 325° F., hard and flexible films were formed.

EXAMPLE XXXIV

(A) Preparation of a hydroxyl containing nitrogen compound

A solution of 370 g. of N-methyl monoethanolamine and 100 g. of methanol was charged into a glass flask equipped with agitator, reflux condenser and having provisions for external heating and cooling. The solution was cooled to 10° C. and 407.5 g. of formaldehyde (37% active) was added over two hours at 10° to 15° C. with vigorous agitation. After addition was complete, a mixture of 1100 g. of nonylphenol and 550 g. of methanol was added over fifteen minutes at 15° to 20° C. with vigorous agitation. The reaction mixture was then heated with agitation to 65° C. and agitated for two hours at 63° to 65° C. to complete reaction. The resulting product which was the hydroxyl containing nitrogen compound was then vacuum distilled to remove water, methanol and other volatiles. Vacuum distillation was continued until a pot temperature of 100° C. was reached. The hydroxyl containing nitrogen compound was heated under vacuum at 100° C. for fifteen minutes and then cooled to 30° C. Analysis showed that the water content of the nitrogen compound was below 0.5% by weight.

(B) Preparation of a prepolymer 257 g. of tolylene diisocyanate and 743 g. of a polypropylene glycol having a molecular weight of 1025 were charged into a glass flask equipped with agitator, external heating and cooling facilities as well as provisions for maintaining a nitrogen blanket over the reactants during reaction to provide anhydrous conditions. The reaction mixture was heated under nitrogen to 75° C. with agitation. It was reacted at 75° to 80° C. until the isocyanate content of the prepolymer was between 6.0% and 6.4% by weight.

(C) Preparation of the treating agent 350 g. (0.25 mole) of the prepolymer obtained in part (B) above and 153.5 g. (0.50 mole) of the hydroxyl containing nitrogen compound obtained in part (A) above were charged into a glass flask. The reactants were heated with agitation to 95° C. and were reacted for ninety minutes at 95° C. to obtain a treating agent.

A composition of 503 g. (0.25 mole) of the treating agent and 200 g. (0.50 mole) of diepoxide in the form of the diglycidyl derivative of 4,4'-dihydroxy-diphenyl-dimethyl methane was prepared by mixing these materials at room temperature. The resulting treating agent composition was found to have excellent properties as an adhesive. The composition was applied to two aluminum blocks which were one sq. in. in area. The coated blocks were pressed together under 10 lbs. pressure and were heated at a temperature of 325° F. for fifteen minutes to cure. The tensile strength of the metal-to-metal bond was determined by means of the Instron Tensile Tester (Instron Engineering Corp., Canton, Mass.). The bond was found to have a tensile strength of 2950 lbs. per sq. in.

EXAMPLE XXXV

Use of a treating agent composition as a pigment binder (A) A composition containing 6% by weight of the treating agent composition obtained in Example X, 2% by weight of the pigment, C.I. RB 31 iron oxide red and 92% by weight of water was prepared by simple mixing and used at room temperature as a padding bath. Fiber glass fabric was padded with this bath by passing the fabric through a threading of one dip and one nip on the Butterworth Padding Machine with 20 lbs. roll presscure. A wet pickup of 25% based on the weight of the fabric was obtained with the bath. The fabric was airdried at room temperature on a pin frame and then cured in an oven at 325° F. for three minutes.

The washfastness of the cured fiber glass sample was evaluated by placing a 4 g. sample of the cured fabric in a one-pine Launder-Ometer jar which contained 150 cc. of a 0.2% by weight solution of a synthetic detergent (Tide—Procter and Gamble Co.) in water and ten rubber balls. This jar was placed in the Launder-Ometer at 130° F. and agitated for ten minutes. After ten minutes, the sample was removed from the jar and given a five-minute warm water rinse. This test showed the pigmented fabric was washfast. The cured fiber glass fabric contained 2.0% of the treating agent based on the weight of fabric.

(B) Using the procedure of part (A) above, the treating agent compositions prepared according to the procedures described in the following examples were used to bind pigments to fiber glass fabric: Examples XII, XIII, XVII, XX, XXI, XXII, XXIII, XXIV, XXVI and XXVII.

Each of the treated fabrics were subsequently evaluated for its washfasteness in the Launder-Ometer test described in part (A) above. The results of these evaluations showed that the pigmented fabrics were washfast.

(C) Using the procedure of part (A) above, the treating agent composition prepared according to Example XXIII was used to bind pigments to cotton, Dacron and mixed cotton-Dacron fabrics.

Each of the treated fabrics were subsequently evaluated in the Launder-Ometer test described in part (A) above. The results of these evaluations showed that the pigmented fabrics was washfast.

Example XXXVI

Dyeing of a colorless coating obtained with a treating composition (A) A dispersion of the treating agent composition obtaind in Example XXIV(C) was prepared by dispersing 15 g. of the treating agent composition in 85 g. of water at 25° C. The dispersion was prepared by adding the water slowly to the composition with constant stirring. A fiber glass fabric was padded with this dispersion by passing the fabric through a threading of one dip and one nip on the Butterworth padding machine with 20 lbs. roll pressure. A wet pickup of 20% based upon the weight of fabric was obtained with the dispersion. The fabric was dried at room temperature on a pin frame and then cured in an oven at 325° F. for three minutes to obtain treated fabric which contained 1.2% of the treating agent based on the weight of fabric.

A dyebath containing 300 cc. of water heated to 50° C., 20 cc. of a 1% solution of C.I. Acid Blue 170 (Cibalan Blue BRL) and 20 cc. of a 1% ammonium sulfate solution was prepared. A 10 g. swatch of the cured fiber glass fabric described above was introduced into the dyebath. The dyebath temperature was brought to 60° C. and held at 60° C. for fifteen minutes. The bath was then heated to 80° C. and held at 80° C. for fifteen minutes. The dyebath was completely exhausted.

The washfastness of the dyed fiber glass fabric was evaluated by placing a 4 g. sample of the dyed fabric in a one-pint Launder-Ometer jar which contained 150 cc. of a 0.2% by weight solution of a synthetic detergent (Tide—Procter and Gamble Co.) in water and ten rubber balls. The jars was placed in the Launder-Ometer at 130° F. and agitated for ten minutes. After ten minutes, the sample was removed from the jar and given a five-minute warm water rinse. This test showed the dyed fabric was washfast.

(B) Using the procedure of part (A) above, samples of cured fiber glass fabric were prepared and dyed with the following dyestuffs: C.I. Acid Yellow C.I. 18,950 (Fast Yellow 2GC), C.I. Acid Yellow 116 (Cibalan Yellow GRL), C.I. Acid Red 251 (Cibalan Bordeaux EL) and C.I. Acid Red 114 (Benzyl Red BR).

Each of the dyed fabrics was subsequently evaluated for its washfastness in the Launder-Ometer test described in part (A) above. The results of these evaluations showed the dyed fabrics were washfast.

(C) Using the procedure of part (A) above, the treating agent compositions prepared according to the procedures described in the following examples were used to coat fiber glass fabrics: Examples XII, XIII, XVII, XX, XXVI and XXVII. The samples of coated fiber glass fabrics were then dried, cured and dyed with C.I. Acid Blue 170.

Each of the dyed faoric samples were subsequently evaluated in the Launder-Ometer test described in part (A) above. The results of these evaluations showed that the dyed fabrics were washfast.

EXAMPLE XXXVII

Dyeing of a colorless coating obtained with a treating agent composition (A) A dispersion of the treating agent composition obtained in Example XXIV(C) was prepared by dispersing 15 g. of the treating agent composition in 85 g. of water at 25° C. The dispersion was prepared by adding water slowly to the treating agent composition with constant stirring. A fiber glass fabric was padded with this dispersion by passing the fabric through a threading of one dip and one nip on the Butterworth padding machine with a 20 lb. roll pressure. A wet pickup of 20% based upon the weight of the fabric was obtained with the dispersion. The fabric was dried at room temperature on a pin frame and then cured in an oven at 325° F. for three minutes.

A dyebath containing 0.3 g. of ammonium hydroxide in 300 cc. of water, 20 cc. of a 1% solution of C.I. Acid Blue 209 (Vialon Fast Blue FFG), 40 cc. of a 1% urea solution and 10 cc. of a 1% solution of a sodium salt of oxyethylated sulfonated fatty alcohol (Uniperol W), was prepared by simple mixing and heated to 60° C. A 10 g. swatch of the cured fiber glass fabric described above was introduced into the dyebath and dyed at 60° C. for thirty minutes. The dyed fabric was evaluated for washfastness in the Launder-Ometer exactly as described in Example XXXVI(A) and found to be washfast. The cured fabric contained 1.2% of treating agent based on the weight of fabric.

(B) Using the procedure of part (A) above, samples of cured fiber glass fabrics were prepared and dyed with the following dyestuffs: C.I. Acid Black 61 (Vialon Fast Blue Grey B), C.I. Acid Red 225 (Vialon Fast Red B) and C.I. Acid Yellow 118 (Vialon Fast Yellow G).

Each of the dyed fabrics was subsequently evaluated for its washfastness in the Launder-Ometer test described in part (A) above. The results of these evaluations showed the dyed fabrics were washfast.

EXAMPLE XXXVIII

Use of a treating agent composition in leather retanning (A) 100 lbs. of chrome tanned shaved side leather was put in a drum and 100% by weight of water based on the weight of leather was added. The leather was washed at 100° F., then drained and floated with 50% by weight or water based on the weight of leather. The water was then heated to 100° F. Thereafter 4% of the treating agent composition obtained in Example XVIII(C)(1) based on the weight of leather was introduced into the drum and the drum rotated for one hour. A solution containing 5% of a synthetic anionic replacement tannin which was the condensation product of urea, formaldehyde and sulfonated cresol and 50% water based on the weight of leather and heated to 100° F. was introduced into the drum and the drum rotated for one hour. The drum was drained and the leather washed for ten minutes at 125° F. with 100% by weight of water based on the weight of leather. The drum was drained and the leather was fat-liquored for forty-five minutes at 125° F. with 5% sulfated vegetable and animal oils in 100% of the water based on the weight of the leather. Fat liquor takeup was complete. The leather was pulled, horsed and dried. The leather showed tight grain effect and excellent temper.

(B) Using the procedure of part (A) above, samples of chrome tanned side leather were retanned with the treating agent compositions prepared by the procedures described in Examples III, VIII and XIII respectively. The samples of leathers showed similar results with variations in temper according to the chain lengths of the glycol used in the preparation of the prepolymer. The short chain length glycols produced more pronounced temper.

EXAMPLE XXXIX

Use of a treating agent composition in leather retanning (A) 100 lbs. of chrome tanned shaved side leather was put in a drum and 100% by weight of water based on the weight of leather was added. The leather was washed at 100° F. The leather was drained and floated at 100° F. with 100% by weight of water based on the weight of leather. Thereafter 10% of the treating agent composition obtained in Example XVIII(C)(2) was introduced into the drum and the drum rotated for one hour. The leather was then drained and washed at 125° F. After washing, the leather was floated at 125° F. with 100% water based on the weight of leather and then fat-liquored with 5% of sulfated vegetable and animal oils based on the weight of leather. Fat liquor takeup was complete after forty-five minutes. The leather was pulled, horsed and dried. The leather showed tight grain effect and excellent temper.

(B) Using the procedure of part (A) above, the treating agent compositions prepared according to the procedures described in the Examples XIX and XXIX(C)(2) respectively were used to retan chrome tanned side leather. The samples of leather showed similar results with variations in temper according to the chain length of the glycol used in the preparation of the prepolymer. The short chain length glycols produced more pronounced temper.

Chrome tanned leather stock containing 50% water based on its wrung, split shaved weight was used in parts (A) and (B) of Examples XXXVIII and XXXIX.

EXAMPLE XL

Use of a treating agent in leather impregnation (A) A 20% by weight composition of the treating agent obtained in Example XXX was prepared by diluting the agent with a 70:30 isopropanol water mixture. The composition was used to impregnate and condition leather which had been previously fat-liquored. Excellent penetration of the leather with the composition was obtained and no evidence of tackiness was noted after the treated leather had been dried.

This composition has several advantages. It can be applied as a spray coating, a curtain coating or by drum application. It is suitable for use on leathers tanned by various methods. Since it does not produce tacky coatings on drying, the finishing coating can be applied immediately after drying.

(B) Using the procedure in part (A) above, samples of leather were impregnated (a) with a composition containing 20% by weight of the treating agent composition described in Example V in isopropanol, and (b) with a 1:1 isopropanol water composition containing 30% by weight of the treating agent composition described in Example XIV and (c) with a 1:1 isopropanol water composition containing 20% by weight of the treating agent composition described in Example IX. Each of these compositions gave excellent penetration of the leather and no evidence of tackiness was noted after drying the treated leather.

EXAMPLE XLI

This example is directed to a determination of the antistatic properties of treating agents on synthetic fabrics.

Three swatches of Dacron fabric which were five inches in width were treated with the treating agent composition obtained in Example XII in the following manner. A 7.5% dispersion of the treating agent composition in water was padded on the fabric by passing the fabric through a threading of one dip and one nip on the Butterworth padding machine with a 20 lb. roll pressure. The fabric was dried at room temperature on a pin frame and then cured in an oven at 325° F. for three minutes to obtain treated swatches which contained 2.4% of the treating agent composition based on the weight of fabric. Three separate swatches of the same Dacron fabric were not treated with the treating agent and were used as blanks in the antistatic tests.

The treated and untreated swatches were tested for antistatic properties after conditioning the swatches for twenty-four hours at 72° F. and 50% relative humidity. A potential of 180 volts was applied to each swatch by connecting the swatch to the positive and negative terminals of the battery. The contact was made by connecting the swatch with positive and negative electrodes which were positioned two and one-half inches apart and were connected to the terminals of the battery. After the voltage was applied, the contact was broken and the charged swatch was connected to a voltmeter which indicated the voltage of the swatch. The time in seconds required for the voltage on the swatch to drop from 160 volts to 80 volts was measured and recorded as half-life seconds. If the treating agent on the swatch has good electrostatic properties, the voltage or charge on the swatch leaks off quickly after the contact is broken.

The three untreated swatches of Dacron gave values of over 200,000 half-life seconds. The three treated swatches which contained 2.4% of the treating agent based on the weight of the fabric gave values of 5,100±600 half-life seconds. These tests showed that treatment of synthetic fabrics with the treating agents of this invention resulted in marked improvement in their antisatic properties, that is, the capacity of the fabrics to retain electrostatic charges was greatly decreased.

EXAMPLE XLII

This example is directed to a determination of the abrasion resistance of treating agent compositions on fabrics. The treating agent compositions shown in the table below were used to prepare 10% aqueous dispersions by weight which were applied on cotton in the following manner. Each dispersion was padded on cotton by passing a sample of cotton fabric through a threading of one dip and one nip on the Butterworth padding machine with a 20 lb. roll pressure. The sample of cotton fabric was dried at room temperature on a pin frame and then cured in an oven at 325° F. for three minutes to obtain treated cotton fabric which contained 5.0% of the treating agent based on the weight of fabric. Samples of the treated fabric were then tested for abrasion resistance on the Taber Abraser, the Standard Abrasion Tester manufactured by the Taber Instrument Corp., North Tonawanda, N.Y., to obtain the results reported in the table as abrasion to rupture.

Table

| Composition of example: | Abrasion to rupture (No. of cycles) |
|---|---|
| Blank | 300 |
| XII | 675 |
| XIII | 4100 |
| XVII | 1700 |
| XI | 875 |
| XX | 1600 |
| XXVII | 1400 |

These data show that treatment of fabrics with the treating agent compositions disclosed in this invention resulted in marked improvement in abrasion resistance properties, that is, the capacity of the fabrics to resist abrasion was greatly increased.

EXAMPLE XLIII (A) This example illustrates the use of a treating agent composition as a bond coating for glass fiber. Fiber glass was treated with the treating agent composition obtained in Example XX. The treating agent composition was applied to the fiber in the following manner. A 7.5% dispersion of the treating agent composition in water was applied to the glass fiber. The fiber was cured at a temperature of 325° F. for three minutes to obtain a treated fiber which contained about 2.3% of the treating agent composition based on the weight of the fiber. The coated fiber was dip coated with a resorcinol formaldehyde latex coating and then molded into a rubber H as described in ASTM designation D2138–621 "Static Adhesion of Textile Cord to Rubber" also known as the "H-Pull Test." This test is described in detail on pp. 992–996 of part 28 of the 1964 ASTM Standards. A value of 7 lbs. was obtained in this test with the treated fiber.

(B) Using the procedure of part (A) above, the treating agent composition prepared by the procedure described in Example XII was evaluated as a bond coating for fiber glass. A value of 7 lbs. was obtained in the "H-Pull Test" with this treating agent.

EXAMPLE XLIV

This example illustrates the use of treating agent compositions as tie bond coatings for glass fiber roving. Glass fiber was treated with the treating agent composition obtained in Example XII. The treating agent composition was applied in the following manner. A 7.5% dispersion of the treating agent composition in water was applied to glass fiber as a coating. The coating was cured at 325° F. for three minutes to obtain a tie bond coating on the fiber which contained about 2.4% of the treating agent composition based on the weight of fiber. A coating polyester was then applied to the tie bond coating on the fiber and cured with a free radical catalyst. The sample had a dry strength of 61,000 lbs. per specimen and a wet strength 70% of the dry strength.

EXAMPLE XLV (A) Preparation of a hydroxyl containing nitrogen compound

A solution of 315 g. of diethanolamine and 60 g. of methanol was charged into a glass flask equipped with agitator, reflux condenser and having provisions for external heating and cooling. The solution was cooled to 10° C. and 244.5 g. of formaldehyde (37% active) was added slowly over one hour while the reaction mixture was agitated at 10° to 15° C. After addition was complete, a mixture of 282 g. of phenol and 25 g. of methanol was added over fifteen minutes with vigorous agitation at 18° to 22° C. The reaction mixture was agitated at 18° to 22° C. for one hour, heated to 65° C. and agitated for two hours at 60° to 65° C. to complete reaction. The resulting product which was a hydroxyl containing nitrogen compound was vacuum distilled to remove water, methanol and other volatiles. Vacuum distillation was continued for one hour after a pot temperature of 110° C. was reached and the water content of the resulting hydroxyl containing nitrogen compound in the flask was less than 0.2% by weight.

(B) Preparation of a prepolymer 743 g. of a polypropylene glycol having a molecular weight of 1025 and 257 g. of tolylene diisocyanate were charged under nitrogen into a glass flask equipped with agitator, external heating and cooling facilities as well as provisions for maintaining a nitrogen blanket over reactants during reaction to provide anhydrous conditions. The reaction mixture was agitated and heated to 60° C. The reaction mixture was then gradually heated to 75° and reacted at 75° to 80° C. for one hour to obtain a prepolymer having an isocyanate content of between 6.0 and 6.4% by weight.

(C) Preparation of the treating agent 21.1 g. of the hydroxyl containing nitrogen compound obtained in part (A) above and 154.1 g. of isopropanol (99% active) were charged into a glass flask equipped with agitator and were agitated at 30° C. until a uniform mixture was obtained. 133.0 g. of the prepolymer obtained in part (B) above was charged to the flask and the reaction mixture heated with agitation to 80° C. The mixture was reacted with agitation at 80° C. for two hours and then cooled to 60° C. 22 g. of 55% formaldehyde in methanol was added to the mixture and the reaction mixture heated with agitation for two hours at 60° to 65° C. to obtain the treating agent.

EXAMPLE XLVI (A) Preparation of a hydroxyl containing nitrogen compound

A hydroxyl containing nitrogen compound was prepared by the procedure described in Example XLV(A) above.

(B) Preparation of a prepolymer 500 g. of a polyethylene glycol having a molecular weight of 4000 was charged to a flask equipped with agitator, external heating and cooling facilities as well as provisions for maintaining a nitrogen blanket over reactants during reaction to provide anhydrous conditions. The glycol was melted by heating to 55° C. under nitrogen. 43.5 g. of tolylene diisocyanate was added with agitation to the molten glycol at 55° C. The reaction mixture was then heated to 75° C. and agitated at 75° C. for forty-five minutes to obtain a prepolymer having an isocyanate content of 1.9% by weight.

(C) Preparation of the treating agent 543.5 g. of the prepolymer obtained in part (B) above was heated to 55° C. to melt and the molten prepolymer was charged into a flask equipped with agitator. 52.8 g. of the hydroxyl containing nitrogen compound obtained in part (A) above was charged with agitation to molten prepolymer at 55° C. The reaction mixture was heated with agitation to 75° C. and reacted at 75° to 80° C. for ninety minutes to obtain the treating agent. A 50% active solution of the treating agent was prepared by adding 596.3 g. of distilled water to the treating agent.

I claim:
1. A composition which comprises
 (I) a treating agent comprising the reaction product of
  (A) a hydroxyl containing nitrogen compound which is the reaction product of
   (1) a phenol,
   (2) at least one aldehyde selected from the group consisting of an aldehyde and precursors thereof, and
   (3) at least one alkanolamine selected from the group consisting of a monoalkanolamine and a dialkanolamine wherein the alkylene group of said alkanolamine has at least two carbon atoms and wherein about one mole of (1), from about one to about three moles of (2) and from about one to about three moles of (3) are reacted for about two to about ten hours at from about 5° to about 110° C. to obtain said (A), (B) a prepolymer which is the reaction product of an organic polyisocyanate and at least one member selected from the group consisting of a polyoxyalkylene polyol and a polyester having at least two terminal hydroxyl groups, wherein said polyisocyanate and said member having terminal hydroxyl groups are reacted in an NCO/OH ratio of at least 1.1:1 under anhydrous conditions at from about 50° C. to about 100° C. to obtain said (B) having at least one reactive NCO group, wherein said (A) and (B) are reacted under anhydrous conditions and in the absence of a blowing agent at an NCO/OH ratio of from about 1:2 to about 1:1 for about one half to about six hours at from about 25° to about 160° C. to obtain said reaction product of (A) and (B), said reaction product characterized by being capable of forming salts with acetic acid which are at least water dispersible, and (C) from 0 up to an amount sufficient to react with all available hydrogen atoms which are present in said (A), said (1) and said reaction product of (A) and (B) of an aldehyde selected from the group consisting of an aldehyde and precursors thereof with the proviso that where aldhyde is so reacted, said reaction is conducted at from about 5° to about 110° for about one to about twenty hours, (II) from 0 to about 20 percent by weight of said treating agent of an acid containing from one to four carbon atoms, (III) from 0 to about 20 percent by weight of said treating agent of a surfactant, (IV) from 0 to about 20 percent by weight of said treating agent of an epoxide having at least eight carbon atoms, (V) from 0 to about 80 percent by weight of said treating agent of a pigment, and (VI) from 0 to about 99 percent by weight of said treating agent of a solvent selected from the group consisting of water, alcohols, chlorinated hydrocarbons and aromatic hydrocarbons.

2. The composition of claim 1 wherein said treating agent is the reaction product of (A) a hydroxyl containing nitrogen compound which is the reaction product of
  (1) a phenol,
  (2) at least one aldehyde selected from the group consisting of an aldehyde having from one to seven carbon atoms and precursors thereof, and
  (3) at least one alkanolamine selected from the group consisting of a monoalkanolamine and a dialkanolamine wherein the alkylene group of said alkanolamine has from two to four carbon atoms, and (B) a prepolymer which is the reaction product of an organic polyisocyanate and at least one member selected from the group consisting of a polyoxyalkylene polyol having a molecular weight of from 300 to 5000 and a polyester having at least two terminal hydroxyl groups and a molecular weight of from 300 to 5000.

3. The composition of claim 2 wherein from about one to three moles of said aldehyde and alkanolamine, present in approximately equimolar amounts with respect to each other, are condensed with about one mole of said phenol.

4. The composition of claim 2 wherein said organic polyisocyanate is tolylene diisocyanate.

5. The composition of claim 2 wherein said polyoxyalkylene glycol is polyoxyethylene glycol having a molecular weight of from 300 to 5000.

6. The composition of claim 2 wherein said polyoxyalkylene glycol is polyoxypropylene glycol having a molecular weight of from 300 to 5000.

7. The composition of claim 2 wherein said alkanolamine is monoethanolamine.

8. The composition of claim 2 wherein said alkanolamine is diethanolamine.

9. The composition of claim 2 wherein said alkanolamine is N-methyl monoethanolamine.

10. The composition of claim 2 wherein said alkanolamine is N-ethyl monoethanolamine.

11. The composition of claim 2 wherein said aldehyde is formaldehyde.

12. The composition of claim 2 wherein said phenol is alkylphenol.

13. The composition of claim 2 wherein said phenol is 4,4′-dihydroxy-diphenyl methane.

14. The composition of claim 2 wherein said
(A) hydroxyl containing nitrogen compound is further reacted with at least one aldehyde selected from the group consisting of an aldehyde having from one to seven carbon atoms and precursors thereof in amounts sufficient to react with up to all of the available reactive hydrogens present in said phenol, and then is reacted with said
(B) prepolymer.

15. The composition of claim 2 wherein said
(A) hydroxyl containing nitrogen compound is reacted with said
(B) prepolymer, said reaction product of (A) and (B) is further reacted with at least one aldehyde selected from the group consisting of an aldehyde having from one to seven carbon atoms and precursors thereof in amounts sufficient to react with up to all of the available reactive hydrogens in said treating agent.

16. The composition of claim 15 wherein from about one to three moles of said aldehyde and alkanolamine, present in equimolar amounts with respect to each other, are condensed with about one mole of said phenol.

17. The composition of claim 15 wherein said organic polyisocyanate is tolylene diisocyanate.

18. The composition of claim 15 wherein said polyoxyalkylene glycol is polyethylene glycol having a molecular weight of from 300 to 5000.

19. The composition of claim 15 wherein said polyoxylkylene glycol is polypropylene glycol having a molecular weight of from 300 to 5000.

20. The composition of claim 15 wherein said alkanolamine is monoethanolamine.

21. The composition of claim 15 wherein said alkanolamine is diethanolamine.

22. The composition of claim 15 wherein said alkanolamine is N-methyl monoethanolamine.

23. The composition of claim 15 wherein said alkanolamine is N-ethyl monoethanolamine.

24. The composition of claim 15 wherein said aldehyde is formaldehyde.

25. The composition of claim 2 wherein said
(A) hydroxyl containing compound is further reacted with at least one aldehyde selected from the group consisting of an aldehyde having from one to seven carbon atoms and precursors thereof in amounts sufficient to react with up to all of the available reactive hydrogens present in said phenol, and said
(B) prepolymer is reacted to form a reaction product of (A) and (B), and said reaction product of (A) and (B) is further reacted with at least one aldehyde selected from the group consisting of an aldehyde having from one to seven carbon atoms and precursors thereof in amounts sufficient to react with up to all of the available reactive hydrogens in said treating agent.

26. A process for preparing a composition which comprises
(A) reacting together to form a treating agent, a hydroxyl containing nitrogen compound and a prepolymer having at least one unreacted isocyanate group under anhydrous conditions and in the absence of a blowing agent at an NCO/OH ratio of from about 1:2 to about 1:1 for about one-half to about six hours at about 25° to about 160° C., said hydroxyl containing nitrogen compound being the reaction product of
   (1) one mole of a phenol,
   (2) from one mole to three moles of at least one aldehyde selected from the group consisting of an aldehyde and precursors thereof, and
   (3) from one to three moles of at least one alkanolamine selected from the group consisting of a monoalkanolamine and a dialkanolamine wherein the alkylene group of said alkanolamine has at least two carbon atoms, wherein said (1), (2) and (3) are reacted together for from about two to about ten hours at about 5° to about 110° C.,
and said prepolymer being the reaction product of an organic polyisocyanate and at least one member selected from the group consisting of a polyoxyalkylene polyol and a polyester having at least two terminal hydroxyl groups, wherein said polyisocyanate and said member having terminal hydroxyl groups are reacted in an NCO/OH ratio of at least 1.1:1 under anhydrous conditions at from about 50° to about 100° C. to obtain said prepolymer, said reaction product of said hydroxyl containing nitrogen compound and said prepolymer characterized by being capable of forming salts with acetic acid which are at least water dispersible, and
(B) reacting from 0 up to an amount sufficient to react with all available hydrogen atoms present in said phenol, said hydroxyl containing nitrogen compound and said reaction product of said hydroxyl containing nitrogen compound and said prepolymer of an aldehyde selected from the group consisting of an aldehyde and precursors thereof at from about one to about twenty hours, and
(C) adding to said treating agent
   (1) from 0 to about 20 percent by weight of said treating agent of an acid containing from one to four carbon atoms,
   (2) from 0 to about 20 percent by weight of said treating agent of a surfactant,
   (3) from 0 to about 20 percent by weight of said treating agent of an epoxide having at least eight carbon atoms,
   (4) from 0 to about 80 percent by weight of said treating agent of a pigment, and
   (5) from 0 to about 99 percent by weight of said treating agent of a solvent selected from the group consisting of water, alcohols, chlorinated hydrocarbons, and aromatic hydrocarbons to obtain said composition.

27. The process of claim 26 wherein said organic polyisocyanate is tolylene diisocyanate.

28. The process of claim 26 wherein said alkanolamine is diethanolamine.

29. The process of claim 26 wherein said aldehyde is formaldehyde.

30. The process of claim 26 including the step of further reacting said hydroxyl containing nitrogen compound at about 5° to about 110° C. for about one to about twenty hours with at least one aldehyde selected from the group consisting of an aldehyde and precursors thereof in amounts sufficient to react with up to all of the reactive hydrogens present in said phenol.

31. The process of claim 26 including the step of further reacting said reaction product of said hydroxyl containing nitrogen compound and said prepolymer at about 5° to about 110° C., for about one to about twenty hours with at least one aldehyde selected from the group consisting of an aldehyde and precursors thereof in amounts sufficient to react with up to all of the available reactive hydrogens in said reaction product of said hydroxyl containing nitrogen compound and said prepolymer.

32. The process of claim 26 including the steps of further reacting said hydroxyl containing nitrogen compound at about 5° to about 110° C. for about one to about twenty hours with at least one aldehyde selected from the group consisting of an aldehyde and precursors thereof in amounts sufficient to react up to all of the reactive hydrogens present in said phenol and further reacting said reaction product of said hydroxyl containing nitrogen compound and said prepolymer at about 5° to about 110° C. for about one to about twenty hours with at least one aldehyde selected from the group consisting of an aldehyde and precursors thereof in amounts sufficient to react with up to all of the available reactive hydrogens in said reaction product of said hydroxyl containing nitrogen compound and said prepolymer.

33. The process of claim 26 wherein said aldehyde is at least one aldehyde selected from the group consisting of an aldehyde having from one to seven carbon atoms and precursors thereof, said alkanolamine is at least one alkanolamine selected from the group consisting of a monoalkanolamine and a dialkanolamine wherein the alkylene group of said alkanolamine has from two to four carbon atoms, and said prepolymer is the reaction product of an organic polyisocyanate and at least one member selected from the group consisting of a polyoxyalkylene polyol having a molecular weight of from 300 to 5000 and a polyester having at least two terminal hydroxyl groups and a molecular weight of from 300 to 5000.

34. The process of claim 33 wherein from about one to three moles of said aldehyde and alkanolamine present in approximately equimolar amounts with respect to each other, are condensed with about one mole of said phenol.

35. Fibers, textiles and the like, treated with the composition of claim 1.

36. A process for coating fibers, textiles and the like which comprises applying to said fibers, textiles and the like a composition which comprises
(I) a treating agent which comprises the reaction product of
   (A) a hydroxyl containing nitrogen compound which is the reaction product of
      (1) a phenol,
      (2) at least one aldehyde selected from the group consisting of an aldehyde and precursors thereof, and
      (3) at least one alkanolamine selected from the group consisting of a monoalkanolamine and a dialkanolamine wherein the alkylene group of said alkanolamine has at least two carbon atoms and
   wherein about one mole of (1), from about one to about three moles of (2) and from about one to about three moles of (3) are reacted for about two to about ten hours at from about 5° to 110° C. to obtain said (A),
   (B) a prepolymer which is the reaction product of an organic polyisocyanate and at least one member selected from the group consisting of a polyoxyalkylene polyol and a polyester having at least two terminal hydroxyl groups, wherein said polyisocyanate and said member having terminal hydroxyl groups are reacted in an NCO/OH ratio of at least 1.1:1 under anhydrous conditions at from about 50° C. to about 100° C. to obtain said (B) having at least one reactive NCO group, wherein said (A) and (B)

are reacted under anhydrous conditions and in the absence of a blowing agent at an NCO/OH ratio of from about 1:2 to about 1:1 for about one half to about six hours at from about 25° to about 160° C. to obtain said reaction product of (A) and (B), said reaction product characterized by being capable of forming salts with acetic acid which are at least water dispersible, (C) from 0 up to an amount sufficient to react with all available hydrogen atoms which are present in said (A), said (1) and said reaction product of (A) and (B) of an aldehyde selected from the group consisting of an aldehyde and precursors thereof with the proviso that where aldehyde is so reacted, said reaction is conducted at from about 5° to about 110° C. for about one to about twenty hours, (II) from 0 to about 20 percent by weight of said treating agent of an acid containing from one to four carbon atoms, (III) from 0 to about 20 percent by weight of said treating agent of a surfactant, (IV) from 0 to about 20 percent by weight of said treating agent of an epoxide having at least eight carbon atoms, (V) from 0 to about 80 percent by weight of said treating agent of a pigment, and (VI) from 0 to about 99 percent by weight of said treating agent of a solvent selected from the group consisting of water, alcohols, chlorinated hydrocarbons and aromatic hydrocarbons, drying the resulting coated fibers, textiles and the like at 30° to 300° F., and thereafter curing the dried, coated fibers, textiles and the like at 200° to 450° F.

37. The process of claim 36 wherein said fiber is glass fiber.

38. The process of claim 36 including the step of dyeing the resulting cured fiber, textiles and the like when said applied composition is free of pigment.

39. A composition for treating leather which comprises
(I) a treating agent comprising the reaction product of
(A) a hydroxyl containing nitrogen compound which is the reaction product of
(1) a phenol,
(2) at least one aldehyde selected from the group consisting of an aldehyde and precursors thereof, and
(3) at least one alkanolamine selected from the group consisting of a monoalkanolamine and a dialkanolamine wherein the alkylene group of said alkanolamine has at least two carbon atoms and
wherein about one mole of (1), from about one to about three moles of (2) and from about one to about three moles of (3) are reacted for about two to about ten hours at from about 5° to about 110° C. to obtain said (A),
(B) a prepolymer which is the reaction product of an organic polyisocyanate and at least one member selected from the group consisting of a polyoxyalkylene polyol and a polyester having at least two terminal hydroxyl groups, wherein said polyisocyanate and said member having terminal hydroxyl groups are reacted in an NCO/OH ratio of at least 1.1:1 under anhydrous conditions at from about 50° to about 100° C. to obtain said (B) having at least one reactive NCO group, wherein said (A) and (B) are reacted under anhydrous conditions and in the absence of a blowing agent at an NCO/OH ratio of from about 1:2 to about 1:1 for about one half to about six hours at from about 25° to about 160° C. to obtain said reaction product of (A) and (B), said reaction product characterized by being capable of forming salts with acetic acid which are at least water dispersible, and (C) from 0 to an amount sufficient to react with all available hydrogen atoms which are present in said (A), said (1) and said reaction product of (A) and (B) of an aldehyde selected from the group consisting of an aldehyde and precursors thereof with the proviso that where aldehyde is so reacted, said reaction is conducted at from about 5° to about 110° C. for about one to about twenty hours, (II) from 0 to about 20 percent by weight of said treating agent of an acid containing from one to four carbon atoms, (III) from 0 to about 99 percent by weight of said treating agent of a solvent selected from the group consisting of water, alcohols, chlorinated hydrocarbons and aromatic hydrocarbons, and (IV) an anionic tanning agent present in an amount up to about 99 percent by weight of said treating agent.

40. The composition of claim 39 wherein said treating agent is the reaction product of a hydroxyl containing nitrogen compound which is the reaction product of a phenol having from one to three reactive hydrogen atoms in the phenolic nucleus, at least one aldehyde selected from the group consisting of an aldehyde and precursors thereof, and an alkanolamine selected from the group consisting of a monoalkanolamine and a dialkanolamine wherein the alkylene group of said alkanolamine has at least two carbon atoms, said reaction product of the hydroxyl containing nitrogen compound and the prepolymer further reacted with at least one aldehyde selected from the group consisting of an aldehyde and precursors thereof in amounts sufficient to react with up to all of the available reactive hydrogens in said treating agent.

41. The composition of claim 39 wherein said treating agent is the reaction product of a hydroxyl containing nitrogen compound which is the reaction product of a phenol having from one to three reactive hydrogen atoms in the phenolic nucleus, at least one aldehyde selected from the group consisting of an aldehyde and precursors thereof, and an alkanolamine selected from the group consisting of a monoalkanolamine and a dialkanolamine wherein the alkylene group of said alkanolamine has at least two carbon atoms, said reaction product of the hydroxyl containing nitrogen compound and the prepolymer further reacted with at least one member of the group consisting of an alcohol and a prepolymer.

42. Leather treated with the composition of claim 39.

43. A process for treating leather comprising applying to said leather the composition of claim 39.

44. A bonding composition which comprises
(I) a treating agent comprising the reaction product of
(A) a hydroxyl containing nitrogen compound which is the reaction product of
(1) a phenol,
(2) at least one aldehyde selected from the group consisting of an aldehyde and precursors thereof, and
(3) at least one alkanolamine selected from the group consisting of a monoalkanolamine and a dialkanolamine wherein the alkylene group of said alkanolamine has at least two carbon atoms and
wherein about one mole of (1), from about one to about three moles of (2) and from about one to about three moles of (3) are reacted for about two to about ten hours at from about 5° to about 110° C. to obtain said (A),
(B) a prepolymer which is the reaction product of an organic polyisocyanate and at least one member selected from the group consisting of a polyoxyalkylene polyol and a polyester having at least two terminal hydroxyl groups, wherein said polyisocyanate and said member having terminal hydroxyl groups are reacted in an NCO/OH ratio of at least 1.1:1 under anhydrous conditions at from about 50° to about 100° C. to obtain said (B) having at least one reactive NCO group, wherein said (A) and (B) are reacted under anhydrous conditions and in the absence of a blowing agent at an NCO/OH ratio of from about 1:2 to about 1:1 for about one half to about six hours at from about 25° to about 160° C. to obtain said reaction product of (A) and (B), said reaction product characterized by being capable of forming salts with acetic acid which are at least water dispersible, and (C) from 0 up to an amount sufficient to react with all available hydrogen atoms which are present in said (A), said (1) and said reaction product of (A) and (B) of an aldehyde selected from the group consisting of an aldehyde and precursors thereof with the proviso that where aldehyde is so reacted, said reaction is conducted at from about 5° to about 110° C. for about one to about twenty hours, (II) an epoxide having at least eight carbon atoms present in an amount up to two moles per mole of said treating agent, and (III) a hydroxyl containing nitrogen compound which is the reaction product of
  (1) a phenol,
  (2) at least one aldehyde selected from the group consisting of an aldehyde and precursors thereof, and
  (3) at least one alkanolamine selected from the group consisting of a monoalkanolamine and a dialkanolamine wherein the alkylene group of said alkanolamine has at least two carbon atoms and wherein about one mole of (1), from about one to about three moles of (2) and from about one to about three moles of (3) are reacted for about two to about ten hours at from about 5° to about 110° C. to obtain said (III), said hydroxyl containing nitrogen compound being present in an amount up to two moles per mole of said treating agent.

45. The bonding composition of claim 44 wherein said treating agent is the reaction product of a hydroxyl containing nitrogen compound which is the reaction product of a phenol having from one to three reactive hydrogen atoms in the phenolic nucleus, at least one aldehyde selected from the group consisting of an aldehyde and precursors thereof, and an alkanolamine selected from the group consisting of a monoalkanolamine and a dialkanolamine wherein the alkylene group of said alkanolamine has at least two carbon atoms, said hydroxyl containing nitrogen compound further reacted with at least one aldehyde selected from the group consisting of aldehyde and precursors thereof in amounts sufficient to react with up to all of the available reactive hydrogens present in the said phenol.

46. A process of bonding comprising
  (A) applying the composition of claim 44 to a substrate, and
  (B) curing said composition on said substrate.

47. Wood, metal and the like bonded with the composition of claim 44.

References Cited

UNITED STATES PATENTS

| | | | |
|---|---|---|---|
| 2,114,122 | 4/1938 | Bruson | 260—570.9 |
| 2,220,834 | 11/1940 | Bruson et al. | 260—570.9 |
| 2,889,883 | 6/1959 | Santora. | |
| 3,043,801 | 7/1962 | Wagner et al. | |
| 3,297,597 | 1/1967 | Edwards et al. | |
| 3,345,309 | 10/1967 | Merten et al. | |

MURRAY TILLMAN, Primary Examiner

JOHN C. BLEUTGE, Assistant Examiner

U.S. Cl. X.R.

8—41, 94.24, 94.26, 100; 117—62.1, 126, 142, 161; 156—331; 161—190; 260—29.2, 29.3, 33.6, 33.8, 47, 51, 51.5, 53, 59, 83.4, 831

PO-1050
(5/69)

UNITED STATES PATENT OFFICE
CERTIFICATE OF CORRECTION

Patent No. 3,462,237     Dated August 19, 1969

Inventor(s) Lucien Sellet

It is certified that error appears in the above-identified patent and that said Letters Patent are hereby corrected as shown below:

Column 1, lines 3 and 4, change "Diamond Alakli Company" to --Diamond Shamrock Corporation--.

SIGNED AND
SEALED
APR 21 1970

(SEAL)
Attest:

Edward M. Fletcher, Jr.
Attesting Officer

WILLIAM E. SCHUYLER, JR.
Commissioner of Patents